United States Patent
Awoniyi et al.

(10) Patent No.: US 9,220,101 B2
(45) Date of Patent: Dec. 22, 2015

(54) SIGNALING AND TRAFFIC CARRIER SPLITTING FOR WIRELESS COMMUNICATIONS SYSTEMS

(75) Inventors: Olufunmilola O. Awoniyi, San Diego, CA (US); Samir Salib Soliman, Poway, CA (US); Bongyong Song, San Diego, CA (US); Soumya Das, San Diego, CA (US); Edwin C. Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/476,647

(22) Filed: May 21, 2012

(65) Prior Publication Data

US 2013/0114473 A1 May 9, 2013

Related U.S. Application Data

(60) Provisional application No. 61/556,777, filed on Nov. 7, 2011, provisional application No. 61/568,742, filed on Dec. 9, 2011.

(51) Int. Cl.
*H04L 1/00* (2006.01)
*H04L 12/26* (2006.01)
(Continued)

(52) U.S. Cl.
CPC .............. *H04W 72/0453* (2013.01); *H04L 1/00* (2013.01); *H04L 1/0006* (2013.01); *H04W 24/10* (2013.01); *H04W 52/44* (2013.01); *H04W 72/04* (2013.01);
(Continued)

(58) Field of Classification Search
USPC ................................................ 370/280, 329
See application file for complete search history.

(56) References Cited

U.S. PATENT DOCUMENTS 5,117,443 A   5/1992   Shires
5,640,385 A   6/1997   Long et al.
(Continued)

FOREIGN PATENT DOCUMENTS

EP   1213868 A1   6/2002
EP   1993237 A2   11/2008
(Continued)

OTHER PUBLICATIONS

Co-pending U.S. Appl. No. 13/707,111, filed Dec. 6, 2012.
(Continued)

*Primary Examiner* — Kwang B Yao
*Assistant Examiner* — Adam Duda
(74) *Attorney, Agent, or Firm* — Charles Chesney

(57) ABSTRACT

Methods, systems, and devices for separating signaling data and traffic data onto separate carriers for wireless communications systems are provided. Some embodiments utilize flexible bandwidth that may utilize portions of spectrum that may not be big enough to fit a normal waveform through utilizing flexible waveforms. Flexible bandwidth systems may lead to reduced data rate on the signaling or other channels. Separating the signaling and the data traffic into different flexible bandwidth carriers so that assigned resources can be customized to different traffic patterns may address this issue. In some embodiments, the signaling data is received and/or transmitted over a first carrier separate from any other traffic data. For example, the signaling data may be received and/or transmitted over the first band carrier without any other traffic data. The traffic data and/or network data associated with the signaling data may be received and/or transmitted over a separate, second carrier.

68 Claims, 20 Drawing Sheets

(51) Int. Cl.

| | | |
|---|---|---|
| *H04W 72/04* | (2009.01) | |
| *H04W 24/10* | (2009.01) | |
| *H04W 72/08* | (2009.01) | |
| *H04W 52/44* | (2009.01) | |
| *H04W 16/14* | (2009.01) | |
| *H04W 72/12* | (2009.01) | |
| *H04W 52/14* | (2009.01) | |
| *H04W 52/24* | (2009.01) | |
| *H04W 52/40* | (2009.01) | |
| *H04W 88/06* | (2009.01) | |
| *H04W 88/10* | (2009.01) | |
| *H04W 84/04* | (2009.01) | |

(52) U.S. Cl.
CPC ........ *H04W 72/082* (2013.01); *H04W 72/1268* (2013.01); *H04W 72/1273* (2013.01); *H04W 16/14* (2013.01); *H04W 52/146* (2013.01); *H04W 52/247* (2013.01); *H04W 52/40* (2013.01); *H04W 72/1215* (2013.01); *H04W 72/1289* (2013.01); *H04W 84/045* (2013.01); *H04W 88/06* (2013.01); *H04W 88/10* (2013.01); *Y02B 60/50* (2013.01)

(56) References Cited

U.S. PATENT DOCUMENTS

| | | | |
|---|---|---|---|
| 5,949,767 | A | 9/1999 | Shoji |
| 6,041,222 | A | 3/2000 | Horton et al. |
| 6,236,647 | B1 | 5/2001 | Amalfitano |
| 6,424,826 | B1 | 7/2002 | Horton et al. |
| 6,535,723 | B1 | 3/2003 | Jiang et al. |
| 6,539,050 | B1 | 3/2003 | Lee et al. |
| 6,693,887 | B2 | 2/2004 | Stanwood et al. |
| 6,694,147 | B1 | 2/2004 | Viswanath et al. |
| 6,829,227 | B1 | 12/2004 | Pitt et al. |
| 6,845,238 | B1 | 1/2005 | Muller |
| 6,944,460 | B2 | 9/2005 | Haartsen |
| 7,010,300 | B1 | 3/2006 | Jones et al. |
| 7,069,035 | B2 | 6/2006 | Chen et al. |
| 7,123,710 | B2 | 10/2006 | Ravishankar |
| 7,123,910 | B2 | 10/2006 | Lucidarme et al. |
| 7,145,876 | B2 | 12/2006 | Huang et al. |
| 7,193,982 | B2 | 3/2007 | Frerking et al. |
| 7,263,365 | B2 | 8/2007 | Rudowicz et al. |
| 7,321,780 | B2 | 1/2008 | Love et al. |
| 7,324,553 | B1 | 1/2008 | Varier et al. |
| 7,394,792 | B1 | 7/2008 | Von Der Embse |
| 7,535,900 | B2 | 5/2009 | Shenoi |
| 7,558,310 | B1 | 7/2009 | Von Der Embse |
| 7,602,707 | B2 | 10/2009 | Guo et al. |
| 7,796,632 | B2 | 9/2010 | Hasty et al. |
| 7,839,900 | B1 | 11/2010 | Herder et al. |
| 7,865,359 | B2 | 1/2011 | Chang |
| 7,898,947 | B2 | 3/2011 | Briscoe et al. |
| 7,953,167 | B2 | 5/2011 | Ode et al. |
| 7,969,858 | B2 | 6/2011 | Laroia et al. |
| 8,000,706 | B2 | 8/2011 | Lee et al. |
| 8,045,972 | B2 | 10/2011 | Ferzali et al. |
| 8,054,893 | B2 | 11/2011 | Mizusawa |
| 8,064,398 | B2 | 11/2011 | Agashe et al. |
| 8,085,713 | B2 | 12/2011 | Kang |
| 8,085,731 | B2 | 12/2011 | Zhao et al. |
| 8,150,344 | B1 | 4/2012 | Goyal et al. |
| 8,169,953 | B2 | 5/2012 | Damnjanovic et al. |
| 8,325,670 | B2 * | 12/2012 | Afrashteh et al. ............ 370/330 |
| 8,514,883 | B2 | 8/2013 | Pan et al. |
| 8,547,840 | B1 | 10/2013 | Kumar et al. |
| 8,873,505 | B2 | 10/2014 | Zhang et al. |
| 2001/0012271 | A1 | 8/2001 | Berger |
| 2002/0065089 | A1 | 5/2002 | Soliman |
| 2002/0110101 | A1 | 8/2002 | Gopalakrishnan et al. |
| 2002/0158801 | A1 | 10/2002 | Crilly et al. |
| 2002/0159501 | A1 | 10/2002 | Agami et al. |
| 2003/0081538 | A1 | 5/2003 | Walton et al. |
| 2003/0203721 | A1 | 10/2003 | Berezdivin et al. |
| 2003/0224730 | A1 | 12/2003 | Muszynski et al. |
| 2004/0128110 | A1 | 7/2004 | Schulte et al. |
| 2005/0065784 | A1 | 3/2005 | McAulay et al. |
| 2005/0208973 | A1 | 9/2005 | Iochi |
| 2006/0171424 | A1 | 8/2006 | Choi |
| 2006/0246930 | A1 | 11/2006 | Kim et al. |
| 2006/0291429 | A1 | 12/2006 | Matusz |
| 2007/0049307 | A1 | 3/2007 | Mueckenheim et al. |
| 2007/0081604 | A1 | 4/2007 | Khan et al. |
| 2007/0217440 | A1 | 9/2007 | Cho et al. |
| 2007/0268959 | A1 | 11/2007 | Bi et al. |
| 2008/0026752 | A1 | 1/2008 | Flore et al. |
| 2008/0095108 | A1 | 4/2008 | Malladi et al. |
| 2008/0144612 | A1 | 6/2008 | Honkasalo et al. |
| 2008/0165892 | A1 | 7/2008 | Yang et al. |
| 2008/0227453 | A1 | 9/2008 | Somasundaram et al. |
| 2008/0253320 | A1 * | 10/2008 | Piggin et al. ............ 370/329 |
| 2008/0298442 | A1 | 12/2008 | Deng et al. |
| 2009/0016320 | A1 | 1/2009 | Li et al. |
| 2009/0042532 | A1 | 2/2009 | Bienas et al. |
| 2009/0074039 | A1 | 3/2009 | Miller |
| 2009/0094650 | A1 | 4/2009 | Carmichael |
| 2009/0116389 | A1 | 5/2009 | Ji et al. |
| 2009/0135713 | A1 | 5/2009 | Hwang et al. |
| 2009/0141689 | A1 | 6/2009 | Parekh et al. |
| 2009/0161732 | A1 | 6/2009 | Miller et al. |
| 2009/0252134 | A1 | 10/2009 | Schlicht et al. |
| 2009/0258671 | A1 | 10/2009 | Kekki et al. |
| 2009/0274096 | A1 | 11/2009 | Fu |
| 2009/0323608 | A1 | 12/2009 | Adachi et al. |
| 2010/0061496 | A1 | 3/2010 | Black et al. |
| 2010/0124940 | A1 | 5/2010 | Hassan et al. |
| 2010/0157910 | A1 | 6/2010 | Nentwig et al. |
| 2010/0159859 | A1 | 6/2010 | Rofougaran |
| 2010/0167741 | A1 | 7/2010 | Lee |
| 2010/0195618 | A1 | 8/2010 | Park et al. |
| 2010/0195619 | A1 | 8/2010 | Bonneville et al. |
| 2010/0195668 | A1 | 8/2010 | Robert et al. |
| 2010/0214031 | A1 | 8/2010 | Yamamoto et al. |
| 2010/0222060 | A1 | 9/2010 | Zhang et al. |
| 2010/0234040 | A1 | 9/2010 | Palanki et al. |
| 2010/0240356 | A1 | 9/2010 | Lee et al. |
| 2010/0246480 | A1 | 9/2010 | Aggarwal et al. |
| 2010/0255849 | A1 | 10/2010 | Ore |
| 2010/0260105 | A1 | 10/2010 | Keller et al. |
| 2010/0279691 | A1 | 11/2010 | Dwyer et al. |
| 2010/0322109 | A1 | 12/2010 | Ahn et al. |
| 2010/0323622 | A1 | 12/2010 | Nentwig |
| 2011/0013530 | A1 | 1/2011 | Rinne et al. |
| 2011/0013550 | A1 | 1/2011 | Wu |
| 2011/0013578 | A1 | 1/2011 | Shimizu et al. |
| 2011/0019556 | A1 | 1/2011 | Hsin et al. |
| 2011/0021216 | A1 | 1/2011 | Pudney et al. |
| 2011/0064162 | A1 | 3/2011 | McCallister et al. |
| 2011/0080893 | A1 | 4/2011 | Fong et al. |
| 2011/0085497 | A1 | 4/2011 | Fang et al. |
| 2011/0086657 | A1 | 4/2011 | Koivisto et al. |
| 2011/0103243 | A1 | 5/2011 | Larsson et al. |
| 2011/0103330 | A1 | 5/2011 | Montojo et al. |
| 2011/0128922 | A1 | 6/2011 | Chen et al. |
| 2011/0134831 | A1 | 6/2011 | Pirskanen |
| 2011/0149853 | A1 | 6/2011 | Olsson et al. |
| 2011/0151913 | A1 | 6/2011 | Forster et al. |
| 2011/0164707 | A1 | 7/2011 | Luo et al. |
| 2011/0205976 | A1 | 8/2011 | Roessel et al. |
| 2011/0217980 | A1 | 9/2011 | Faurie et al. |
| 2011/0244870 | A1 | 10/2011 | Lee |
| 2011/0267978 | A1 | 11/2011 | Etemad |
| 2011/0268045 | A1 | 11/2011 | Heo et al. |
| 2011/0269453 | A1 | 11/2011 | Ranta-Aho et al. |
| 2011/0276701 | A1 | 11/2011 | Purnadi et al. |
| 2011/0310835 | A1 | 12/2011 | Cho et al. |
| 2012/0002643 | A1 | 1/2012 | Chung et al. |
| 2012/0015656 | A1 | 1/2012 | Tiwari |
| 2012/0044844 | A1 | 2/2012 | Trainin |
| 2012/0063421 | A1 | 3/2012 | Wu |
| 2012/0102162 | A1 | 4/2012 | Devireddy |

(56) References Cited

U.S. PATENT DOCUMENTS

| | | |
|---|---|---|
| 2012/0113982 A1 | 5/2012 | Akselin et al. |
| 2012/0120789 A1 | 5/2012 | Ramachandran et al. |
| 2012/0140743 A1 | 6/2012 | Pelletier et al. |
| 2012/0142367 A1 | 6/2012 | Przybylski |
| 2012/0149377 A1 | 6/2012 | Su et al. |
| 2012/0157101 A1 | 6/2012 | Uemura et al. |
| 2012/0163249 A1 | 6/2012 | Chin et al. |
| 2012/0165019 A1 | 6/2012 | Shintani et al. |
| 2012/0195209 A1 | 8/2012 | Jain et al. |
| 2012/0202501 A1 | 8/2012 | Morioka et al. |
| 2013/0017805 A1 | 1/2013 | Henk et al. |
| 2013/0044613 A1 | 2/2013 | Edara et al. |
| 2013/0083778 A1 | 4/2013 | Wang |
| 2013/0084870 A1 | 4/2013 | Nylander et al. |
| 2013/0114415 A1 | 5/2013 | Das et al. |
| 2013/0114433 A1 | 5/2013 | Park et al. |
| 2013/0114436 A1 | 5/2013 | Dural et al. |
| 2013/0114566 A1 | 5/2013 | Awoniyi et al. |
| 2013/0114571 A1 | 5/2013 | Das et al. |
| 2013/0115967 A1 | 5/2013 | Soliman et al. |
| 2013/0115991 A1 | 5/2013 | Awoniyi et al. |
| 2013/0115994 A1 | 5/2013 | Awoniyi et al. |
| 2013/0121265 A1 | 5/2013 | Awoniyi et al. |
| 2013/0122921 A1 | 5/2013 | Juppi et al. |
| 2013/0148520 A1 | 6/2013 | Das et al. |
| 2013/0148527 A1 | 6/2013 | Awiniyi et al. |
| 2013/0148576 A1 | 6/2013 | Huang et al. |
| 2013/0148579 A1 | 6/2013 | Das et al. |
| 2013/0148627 A1 | 6/2013 | Das et al. |
| 2013/0148628 A1 | 6/2013 | Das et al. |
| 2013/0148629 A1 | 6/2013 | Das et al. |
| 2013/0150045 A1 | 6/2013 | Das et al. |
| 2013/0176952 A1 | 7/2013 | Shin et al. |
| 2013/0182655 A1 | 7/2013 | Das et al. |
| 2013/0329670 A1* | 12/2013 | Tang et al. .................. 370/329 |
| 2014/0044431 A1 | 2/2014 | Hussain et al. |
| 2014/0206350 A1 | 7/2014 | Rinne et al. |

FOREIGN PATENT DOCUMENTS

| | | |
|---|---|---|
| EP | 2317816 A1 | 5/2011 |
| EP | 2385653 A2 | 11/2011 |
| EP | 2493257 A1 | 8/2012 |
| GB | 2386506 A | 9/2003 |
| GB | 2421880 A | 7/2006 |
| JP | H08288884 A | 11/1996 |
| JP | H10511818 A | 11/1998 |
| JP | 2002330467 A | 11/2002 |
| JP | 2002344965 A | 11/2002 |
| JP | 2003051849 A | 2/2003 |
| JP | 2003264524 A | 9/2003 |
| JP | 2004173019 A | 6/2004 |
| JP | 2004350259 A | 12/2004 |
| JP | 2006094005 A | 4/2006 |
| JP | 2006515119 A | 5/2006 |
| JP | 2006303739 A | 11/2006 |
| JP | 2009060601 A | 3/2009 |
| JP | 2009218638 A | 9/2009 |
| JP | 2009545227 A | 12/2009 |
| JP | 2010011397 A | 1/2010 |
| JP | 2011097443 A | 5/2011 |
| JP | 2011521507 A | 7/2011 |
| JP | 2011176687 A | 9/2011 |
| JP | 2012525723 A | 10/2012 |
| JP | 2013509055 A | 3/2013 |
| JP | 2013524607 A | 6/2013 |
| KR | 20070049091 A | 5/2007 |
| KR | 20070058683 A | 6/2007 |
| KR | 20080034857 A | 4/2008 |
| KR | 20080106092 A | 12/2008 |
| KR | 20090015857 A | 2/2009 |
| KR | 20110067655 A | 6/2011 |
| WO | 9610320 A2 | 4/1996 |
| WO | 9900911 A1 | 1/1999 |
| WO | 0120942 A1 | 3/2001 |
| WO | 03034645 A1 | 4/2003 |
| WO | 03092212 A1 | 11/2003 |
| WO | 2005112566 A2 | 12/2005 |
| WO | 2006046307 A1 | 5/2006 |
| WO | 2006110875 A1 | 10/2006 |
| WO | 2006125149 A2 | 11/2006 |
| WO | 2007024748 A2 | 3/2007 |
| WO | 2007148911 A1 | 12/2007 |
| WO | 2008015512 A2 | 2/2008 |
| WO | 2009124377 A1 | 10/2009 |
| WO | 2010105232 | 9/2010 |
| WO | 2010126418 A1 | 11/2010 |
| WO | 2010141607 | 12/2010 |
| WO | 2010150767 A1 | 12/2010 |
| WO | 2011047619 A1 | 4/2011 |
| WO | 2011053974 | 5/2011 |
| WO | 2011121175 A1 | 10/2011 |
| WO | 2013070710 A2 | 5/2013 |
| WO | 2013070738 A1 | 5/2013 |
| WO | 2013070751 A1 | 5/2013 |

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 10)", 3GPP Standard; 3GPP TS 36.304, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 28, 2011, pp. 1-33. XP050554208, [retrieved on Sep. 28, 2011].

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 30, 2011, pp. 1-296, XP050554294, [retrieved on Sep. 30, 2011].

3GPPTS 36.101, "3rd Generation Partnership Project; Technical Specification Group Radio Access Network; Evolved Universal Terrestrial Radio Access (E-UTRA); User Equipment (UE) radio transmission and reception (Release 10)", 3GPP Standard; 3GPP TS 36.101, 3rd Generation Partnership Project (3GPP), Mobile Competence Centre ; 650, Route Des Lucioles; F-06921 Sophia-Antipolis Cedex ; France, vol. RAN WG4, No. V10.4.0, Oct. 3, 2011, pp. 1-242, XP050554352, [retrieved on Oct. 3, 2011].

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, 3rd Generation Partnership Project (3GPP), Mobile Competence Centre ; 650, Route Des Lucioles ; F-06921 Sophia-Antipolis Cedex; France, vol. RAN WG2, No. V10.5.0, Sep. 28, 2011, pp. 1-194.

Co-pending U.S. Appl. No. 13/363,538, filed Feb. 1, 2012.

Huawei, "R2-084311: Scaling measurement and cell reselection parameters," 3GPP TSG RAN WG2 #63 [Online] 2008, pp. 1-8.

International Search Report and Written Opinion—PCT/US2012/063886—ISA/EPO—Mar. 26, 2013.

Lin, et al., "Mobility management: from GPRS to UMTS," Wireless Communications and Mbile Cmputing, 2001, pp. 339-359.

NEC Group: "Framework to define additional carrier type: Carrier segments", R1-113227, 3rd Generation Partnership Project (3GPP), Mobile Competence Centre ; 650, Route Des Lucioles ; F-06921 Sophia-Antipolis Cedex ; France, vol. RAN WG1, No. Zhuhai; Oct. 4, 2011,XP050538345.

R2-073069: E-UTRA Cell Selection and Cell Reselection Aspects. 3GPP TSG-RAN WG2 Meeting #59 [Online] 2007, pp. 1-11.

3GPP TS 23.099 V11.0.0 (Sep. 2011), 3rd Generation Partnership Project; Technical Specification Group Core Network and Terminals; Handover procedures (Release 11).

(56) References Cited

OTHER PUBLICATIONS

3GPP TS 25.331 v11.0.0 (Dec. 2011), 3rd Generation Partnership Project; Technical Specification Group Radio Access Network; Radio Resource Control (RRC); Protocol specification (Release 11).
3GPP TS 25.413 V10.5.0 (Mar. 2012), 3rd Generation Partnership Project; Technical Specification Group Radio Access Network; UTRAN Iu interface, Radio Access Network Application Part (RANAP) signalling (Release 10).
3GPP TS 34.108 V9.6.0 (Sep. 2011), 3rd Generation Partnership Project; Technical Specification Group Radio Access Network; Common test environments for User Equipment (UE); Conformance testing (Release 9).
3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route Des Lucioles; F-06921 Sophia-Antipolis Cedex; France, No. V9.0.0, Apr. 21, 2010, pp. 1-34, XP050402561, [retrieved on Apr. 21, 2010].
"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Centre; 650, Route Des Lucioles; F-06921 Sophiaantipolis Cedex; France, vol. SA WG2, No. V10.5.0, Aug. 24, 2011, pp. 1-79, XP050553745, [retrieved on Aug. 24, 2011].
"3rd Generation Partnership Project; Technical Specification Group Services and System Aspects; Single Radio Voice Call Continuity (SRVCC); Stage 2 (Release 11)", 3GPP Standard; 3GPP TS 23.216, 3rd Generation Partnership Project (3GPP), Mobile Competence Centre; 650, Route Des Lucioles; F-06921 Sophiaantipolis Cedex; France, vol. SA WG2; No. V11.2.0, Aug. 24, 2011, pp. 1-53, XP050553738, [retrieved on Aug. 24, 2011].
Abeta S., "Toward LTE commercial launch and future plan for LTE enhancements (LTE-Advanced)", Communication Systems (ICCS), 2010 IEEE International Conference on, IEEE, Piscataway, NJ, USA, Nov. 17, 2010, pp. 146-150, XP031848276, ISBN: 978-1-4244-7004-4.
Arjona A., et al., "Live network Performance Challenge FLASH-OFDM Vs HSDPA," 22nd International Conference on Advanced Information Networking and Applications, 2008, pp. 918-925.
Black, et al., "Interference Cancellation Techniques for CDMA2000 1x Reverse Link", IEEE Globecom 2009, Global Telecommunications Conference, 2009, 5 pages.
Co-pending U.S. Appl. No. 14/091,933, filed Nov. 27, 2013.

Ericsson: "LTE Spurious emission concept for flexible bandwidth", 3GPP Draft; R4-051130, 3rd Generation Partnership Project (3GPP), Mobile Competence Centre, 650, Route Des Lucioles; F-06921 Sophia-Antipolis Cedex; France, vol. RAN WG4, No. Seoul, Korea; 20051103, Nov. 3, 2005, XP050174721.
Gessner C., et al., "Voice and SMS in LTE White Paper," Rohde & Schwarz GmbH & Co. KG, 2011, pp. 1-45.
IEEE STD 802.11tm-2007: "IEEE Standard for Information technology—Telecommunications and Information exchange between systems—Local and metropolitan area networks—Specific requirements Part 11: Wireless LAN Medium Access Control (MAC) and Physical Layer (PHY) Specifications," 2007, pp. 1-98.
Klerer M., "Introduction to IEEE 802.20," Technical and procedural Orientation, IEEE 802.20—PD-04, Mar. 10, 2003.
Marks R.B., "The IEEE 802.16 Wireless MAN Standard for Broadband Wireless Metropolitan Area Networks," Apr. 16, 2003.
Qualcomm Incorporated: "Flexible Bandwidth Usage for UMTS FDD", 3GPP Draft; R1-125194 Flexible Bandwidth Usage UMTS FDD, 3rd Generation Partnership Project—(3GPP), Mobile Competence Centre; 650, Route Des Lucioles; F-06921 Sophia-Antipolis Cedex; France vol. RAN WG1, No. New Orleans, USA; 20121112-20121116 Nov. 3, 2012, XP050663037, Retrieved from the Internet: URL:http://www.3gpp.org/ftp/tsgran/WG1RL_1/TSGR1_71/Docs/.
Qunhui C., "Evolution and deployment of VoLTE", Huawei Communicate, Sep. 1, 2011, XP055052291, pp. 52-55.
"Understanding CS Fallback in LTE", Sep. 27, 2009, XP055052327.
ZTE: "Discussion on activation and deactivation", 3GPP Draft; R2-103719, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628, Jun. 22, 2010, XP050451195, [retrieved on Jun. 22, 2010].
3GPP TS 25.213 "3rd Generation Partnership Project; Technical Specification Group Radio Access Network; Spreading and modulation," version 9.2.0, release 9, Sep. 2010.
Holma, H., et al., "WCDMA for UMTS—HSPA Evolution and LTE (4th Edition)" In: "WCDMA for UMTS—HSPA Evolution and LTE (4th Edition)", Jan. 1, 2007, John Wiley & Sons Ltd., UK, XP055052236, ISBN: 978-0-47-031933-8, pp. 74-75.
Samsung: "FDD/TDD dual mode UE capability handling", 3GPP Draft; 36331_CRXXXX_(REL-10)_R2-116035 FDD TDD Dual Mode UE, 3rd Generation Partnership Project (3GPP), Mobile Competence Centre; 650, Route Des Lucioles; F-06921 Sophia-Antipolis Cedex; France, vol. RAN WG2, No. San Francisco, USA; 20111114-20111119, Nov. 7, 2011, XP050564131, [retrieved on Nov. 7, 2011].

* cited by examiner

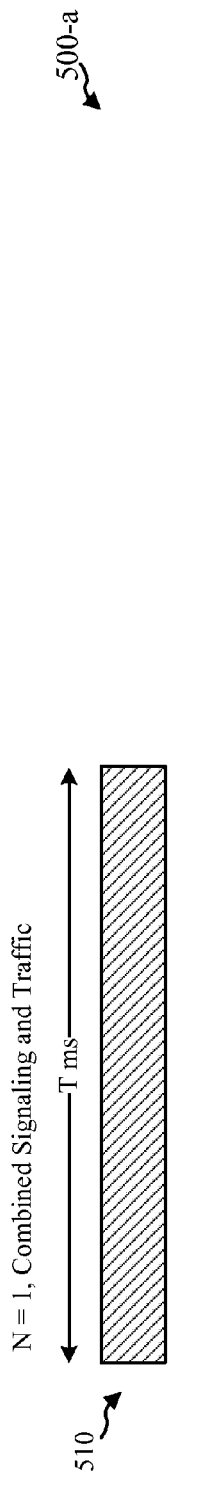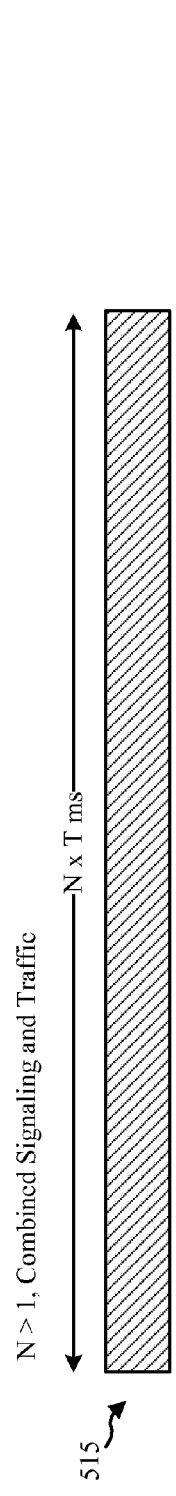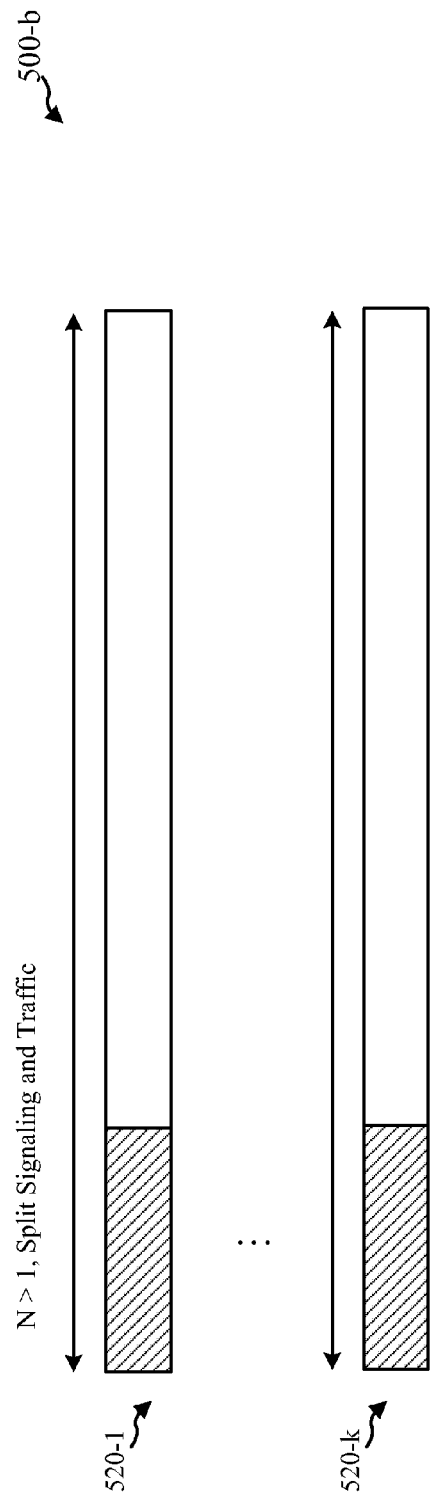
FIG. 5A
FIG. 5B

| UE States 605 | Required Rel'99 Channels in UE State 610 | Channel Functions 615 | FB Carrier Assignment 620 | Comments |
|---|---|---|---|---|
| IDLE | • P-CCPCH<br>• PICH, S-CCPCH<br>• P-SCH, S-SCH<br>• CPICH | • Broadcast SI<br>• Pages<br>• Synchronization<br>• Pilots | Signaling | No UL transmission may be required |
| CELL_FACH | • CPICH<br>• S-CCPCH/PRACH<br>• AICH<br>• P-SCH, S-SCH | • Pilots<br>• Traffic<br>• Control<br>• Synchronization* | Traffic /signaling | • For CELL_FACH in a traffic carrier, differential info. typically broadcasted in a regular carrier are sent to UE directly<br>• *P/S-SCH may be required |
| CELL_DCH | • CPICH+<br>• DPDCH/DPCCH<br>• P-SCH, S-SCH* | • Pilots<br>• Traffic<br>• Synchronization* | Traffic | • *P/S-SCH may be required<br>• –CPICH may not be needed if the pilots in DPCH provide adequate performance gains |
| URA_PCH/ CELL_PCH | • P-CCPCH<br>• PICH, S-CCPCH<br>• CPICH | • Broadcast SI<br>• Pages<br>• Pilots | Signaling | No UL transmission may be required |

FIG. 6A

| UE States 625 | Freed up Channels 630 | FB Carrier 635 |
|---|---|---|
| IDLE /URA_PCH/ CELL_PCH | Embodiment I<br>• S-CCPCH for data<br>• AICH<br>• PRACH<br><br>Embodiments I & II<br>• DPDCH/DPCCH | Signaling |
| CELL_FACH | Traffic<br>• P-CCPCH<br>• S-CCPCH for pages<br>• PICH<br><br>Signaling\traffic<br>• DPDCH/DPCCH | Traffic / Signaling |
| CELL_DCH | • P-CCPCH<br>• PICH<br>• S-CCPCH<br>• AICH<br>• PRACH | Traffic |

FIG. 6B

SIGNALING AND TRAFFIC CARRIER SPLITTING FOR WIRELESS COMMUNICATIONS SYSTEMS

CROSS-RELATED APPLICATIONS

The present application for patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein. The present application for patent also claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein.

BACKGROUND

Wireless communications systems are widely deployed to provide various types of communication content such as voice, video, packet data, messaging, broadcast messages, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiples of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. This may provide one partial solution to the problem. Another approach may be to utilize flexible bandwidth systems that may involve wireless communications systems that utilize portions of spectrum that may not be big enough to fit a normal waveform. A flexible bandwidth system, however, may lead to reduced data rate on the signaling or other channels.

SUMMARY

Methods, systems, and devices for separating signaling and traffic data into separate carriers for wireless communications systems are provided. Some embodiments address reduced capacity issues, such as reduced data rates on the signaling or other channels, as a result of utilizing flexible bandwidth. Some embodiments provide for boosting capacity in wireless communications systems. For example, separating the signaling and the data traffic into different carriers, which may be flexible bandwidth carriers in some cases, may be utilized so that assigned resources can be customized to different traffic patterns. In some embodiments, the signaling data is received and/or transmitted over a first carrier separate from any other traffic data. For example, signaling data may be received and/or transmitted over the first carrier without any other traffic data. The traffic data may be transmitted and/or received over a second carrier. The traffic data may be associated with the signaling data. The first carrier and/or the second carrier may be flexible bandwidth carriers. Some embodiments provide for transitioning between the first and second carriers. Some embodiments provide for performing a transition to utilizing the first and second carriers.

Flexible bandwidths systems may involve wireless communications systems that utilize portions of spectrum that may not be big enough to fit a normal waveform utilizing flexible waveforms. A flexible bandwidth system may be generated with respect to a normal bandwidth system through dilating, or scaling down, the time or the chip rate of the flexible bandwidth system with respect to the normal carrier bandwidth system. Some embodiments increase the bandwidth of a flexible waveform through expanding, or scaling up, the time or the chip rate of the flexible carrier bandwidth system.

Some embodiments include a method of wireless communications that includes receiving signaling data over a first carrier; and/or transitioning from receiving the signaling data over the first carrier to at least transmitting or receiving traffic data over a second carrier. Some embodiments include performing a transition from at least transmitting or receiving the traffic data over the second carrier to receiving the signaling data over the first carrier. Some embodiments include transitioning from at least transmitting or receiving the traffic data over the second carrier to at least transmitting or receiving the traffic data over a third carrier. Some embodiments include transitioning from receiving the signaling data over the first carrier to receiving the signaling data over a fourth carrier. In some embodiments, signaling data is transmitted over the first carrier. In some embodiments, the first carrier carries information regarding the second carrier. Receiving the signaling data over the first carrier and at least transmitting or receiving the traffic data over the second carrier may occur a mobile device.

In some embodiments, at least the first carrier or the second carrier includes a flexible bandwidth carrier. In some embodiments, the first carrier utilizes a first bandwidth and the second carrier utilizes a second bandwidth. Some embodiments include scaling the first bandwidth utilizing a first scaling factor; and/or scaling the second bandwidth utilizing a second scaling factor. At least the first bandwidth or the second bandwidth may be adjusted dynamically. Adjusting at least the first bandwidth or the second bandwidth dynamically may include adjusting at least the first bandwidth or the second bandwidth based upon expected traffic demand. In some embodiments, scaling at least the first bandwidth utilizing the first scaling factor or scaling the second bandwidth utilizing the second factor include scaling at least an uplink or a downlink for at least the first bandwidth or the second bandwidth utilizing different scaling factors.

Some embodiments include a method of wireless communications that includes at least transmitting or receiving traffic data over a first carrier; and/or transmitting signaling data over a second carrier separate from any other traffic data. Some embodiments include transitioning from at least transmitting or receiving the traffic data to a mobile device over the first carrier to transmitting the signaling data to the mobile device over the second carrier. Some embodiments include transitioning from transmitting the signaling data to the mobile device over the second carrier to at least transmitting or receiving the traffic data to the mobile device over the first carrier. Some embodiments include performing a transition to at least transmitting or receiving the traffic data over the first carrier and transmitting the signaling data over the second carrier. In some embodiments, the second carrier carries information regarding at least the first carrier. Some embodiments include receiving signaling data over the second carrier.

In some embodiments, at least the first carrier or the second carrier includes a flexible bandwidth carrier. The first bandwidth and the second bandwidth may utilize a common scaling factor. At least the first carrier or the second carrier may include a normal bandwidth carrier.

In some embodiments, at least transmitting or receiving the traffic data or transmitting the signaling data boosts at least a signaling capacity, a traffic capacity, or a paging capacity. In some embodiments, the signaling data includes at least broadcast messages, system information paging, synchronization, pilot data, cell configuration parameters, pages, or operator specific information that may or not may not be needed for traffic data transmission on the first carrier. The traffic data may include at least user data or control information to assist the traffic data.

In some embodiments, the second carrier is utilized for an idle mode and the first bandwidth carrier is utilized for a connected mode. In some embodiments, users within the first carrier and the second carrier are separated by at least codes, time, or frequency. Users on the first carrier may be separated differently from those on the second carrier. Users within the first carrier are separated by time and the users on the second carrier may be separated by frequency.

In some embodiments, the first carrier utilizes FDD and the second carrier utilizes TDD. In some embodiments, at least the first carrier or the second carrier separates forward link and reverse link transmissions utilizing at least codes, time, or frequency. The first carrier and the second carrier may separate forward link and reverse link transmissions in different ways.

In some embodiments, a bandwidth of the first carrier is scaled utilizing a first scaling factor and a bandwidth of the second carrier is scaled utilizing a second scaling factor. At least the first scaling factor or the second scaling factor may be dynamically adjusted. Dynamically adjusting at least the first scaling factor or the second scaling factor may be based upon expected traffic demand.

Some embodiments include at least transmitting or receiving traffic data over a third carrier; and/or transmitting signaling data over the second carrier. The second carrier may carrier information regarding at least the first carrier or the third carrier. Some embodiments include at least transmitting or receiving traffic data over a third carrier; and/or transmitting signaling data over a fourth carrier. The fourth carrier may carry information regarding at least the first carrier or the third carrier and the second carrier carriers may carry information regarding at least the first carrier or the third carrier.

In some embodiments, at least transmitting or receiving at least the traffic data or the signaling data occurs at a base station. In some embodiments, at least transmitting or receiving at least the traffic data or the signaling data occurs at a mobile device.

Some embodiments include a wireless communications system that includes: a means for receiving signaling data over a first carrier; and a means for transitioning from receiving signaling data over the first carrier to at least transmitting or receiving traffic data over a second carrier. Some embodiments include a means for performing a transition from at least transmitting or receiving the traffic data over the second carrier to receiving the signaling data over the first carrier.

In some embodiments, a first carrier utilizes a first bandwidth and the second carrier utilizes a second bandwidth. Some embodiments may also include: a means for scaling the first bandwidth utilizing a first scaling factor; and/or a means for scaling the second bandwidth utilizing a second scaling factor. Some embodiments include a means for adjusting at least the first scaling factor or the second scaling factor dynamically. The means for adjusting at least the first scaling factor or the second scaling factor dynamically may include a means for adjusting at least the first scaling factor or the second scaling factor based upon expected traffic demand.

Some embodiments include a computer program product for a wireless communications system that includes a non-transitory computer-readable medium that includes: code for receiving signaling data over a first carrier; and/or code for transitioning from receiving signaling data over the first carrier to at least transmitting or receiving traffic data over a second carrier.

The non-transitory computer-readable medium may include code for performing a transition from at least transmitting or receiving the traffic data over the second carrier to receiving the signaling data over the first carrier. The non-transitory computer-readable medium may include: code for scaling a bandwidth of the first carrier utilizing a first scaling factor; and/or code for scaling a bandwidth of the second carrier utilizing a second scaling factor. The non-transitory computer-readable medium may include code for adjusting at least the first scaling factor or the second scaling factor dynamically. The non-transitory computer-readable medium including code for adjusting at least the first scaling factor or the second scaling factor dynamically may include code for adjusting at least the first scaling factor or the second scaling factor based upon expected traffic demand.

Some embodiments include a wireless communications device that includes at least one processor configured to: receive signaling data over a first carrier; and/or transition from receiving signaling data over the first carrier to at least transmitting or receiving traffic data over a second carrier. The device may also include at least one memory coupled with the at least one processor. The at least one processor may be configured to: perform a transition from at least transmitting or receiving the traffic data over the second carrier to receiving the signaling data over the first carrier. The at least one processor may be configured to: scale a bandwidth of the first carrier utilizing a first scaling factor; and/or scale a bandwidth of the second carrier utilizing a second scaling factor. The at least one processor may be configured to adjust at least the first scaling factor or the second scaling factor dynamically. The at least one processor configured to adjust at least the first scaling factor or the second scaling factor dynamically may be configured to adjust at least the first scaling factor or the second scaling factor based upon expected traffic demand.

Some embodiments include a wireless communications system that includes: a means for at least transmitting or receiving traffic data over a first carrier; and/or a means for transmitting signaling data over a second carrier separate from any other traffic data. The system may include a means for transitioning from at least transmitting or receiving the traffic data to a mobile device over the first carrier to transmitting the signaling data to the mobile device over the second carrier. The system may include a means for transitioning from transmitting the signaling data to the mobile device over the second carrier to at least transmitting or receiving the traffic data to the mobile device over the first carrier. Some embodiments include a means for performing a transition to at least transmitting or receiving the traffic data over the first carrier and transmitting signaling data over the second carrier. Some embodiments include a means for at least transmitting or receiving the traffic data over a third carrier; and/or a means for transmitting signaling data over the second carrier. The second carrier may include information regarding at least the first carrier or the second carrier.

Some embodiments include a computer program product for a wireless communications system that include a non-transitory computer-readable medium that includes: code for at least transmitting or receiving traffic data over a first carrier; and/or code for transmitting signaling data over a second carrier separate from any other traffic data. The non-transitory computer-readable medium may include code for transitioning from at least transmitting or receiving the traffic data to a mobile device over the first carrier to transmitting the signaling data to the mobile device over the second carrier. Some embodiments include code for transitioning from transmitting the signaling data to the mobile device over the second carrier to at least transmitting or receiving the traffic data to the mobile device over the first carrier. The non-transitory computer-readable medium may include code for performing a transition to at least transmitting or receiving the traffic data over the first carrier and transmitting signaling data over the second carrier. The non-transitory computer-readable medium may include: code for at least transmitting or receiving traffic data over a third carrier; and/or code for transmitting signaling data over the second carrier, wherein the second carrier carriers carries information regarding at least the first carrier or the third carrier.

Some embodiments include a wireless device that includes at least one processor configured to: at least transmit or receive traffic data over a first carrier; and/or transmit signaling data over a second carrier separate from any other traffic data. The device may include at least one memory coupled with the at least one processor. The at least one processor may be configured to transition from at least transmitting or receiving the traffic data to a mobile device over the first carrier to transmitting the signaling data to the mobile device over the second carrier. The at least one processor may be configured to transition from transmitting the signaling data to the mobile device over the second carrier to transmitting the traffic data to the mobile device over the first carrier. The at least one processor may be configured to perform a transition to at least transmitting or receiving the traffic data over the first carrier and transmitting signaling data over the second carrier. The at least one processor may be configured to: at least transmit or receive traffic data over a third carrier; and/or transmit signaling data over the second carrier. The second carrier may carry information regarding at least the first carrier or the third carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 5A and 5B show examples of combining signaling data and traffic data and splitting signaling data and traffic data onto a signal flexible bandwidth carrier and a traffic flexible bandwidth carrier respectively in accordance with various embodiments;

FIG. 6A shows a table reflecting different WCDMA Release 99 channels and mobile device (UE) Radio Resource Control (RRC) states with respect to signaling and traffic flexible bandwidth carrier assignments in accordance with various embodiments;

FIG. 6B shows a table reflecting freed-up WCDMA Release 99 channels resulting from separating signaling and traffic data onto different flexible bandwidth carriers in accordance with various embodiments;

DETAILED DESCRIPTION

Figure 1:
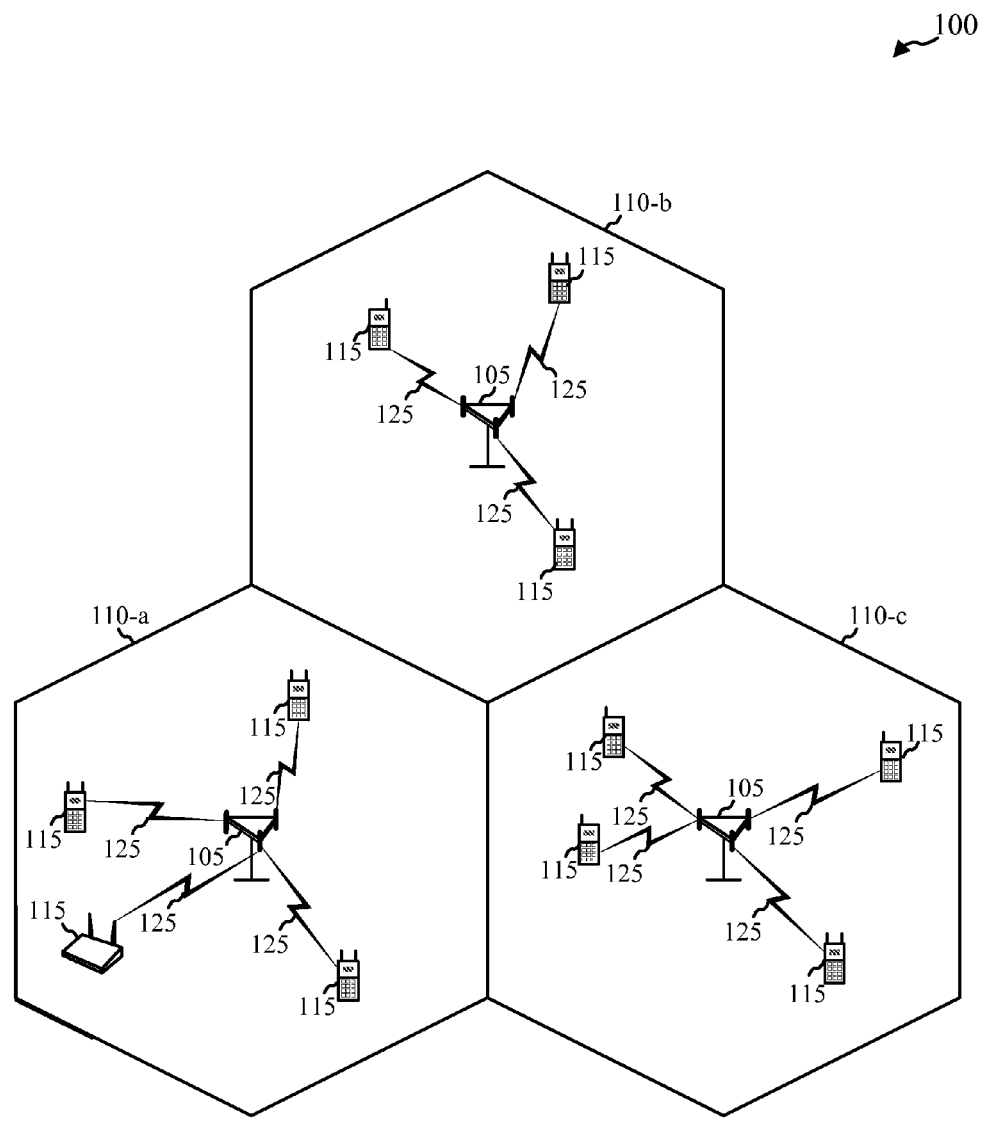
FIG. 1 shows a block diagram of a wireless communications system in accordance with various embodiments.

Methods, systems, and devices for separating signaling and traffic data into separate carriers for wireless communications systems are provided. Some embodiments address reduced capacity issues, such as reduced data rates on the signaling or other channels, as a result of utilizing flexible bandwidth. Some embodiments provide for boosting capacity in wireless communications systems. For example, separating the signaling and the data traffic into different carriers, which may be flexible bandwidth carriers in some cases, may be utilized so that assigned resources can be customized to different traffic patterns. In some embodiments, the signaling data is received and/or transmitted over a first carrier separate from any other traffic data. For example, signaling data may be received and/or transmitted over the first carrier without any other traffic data. The traffic data may be transmitted and/or received over a second carrier. The traffic data may be associated with the signaling data. The first carrier and/or the second carrier may be flexible bandwidth carriers. Some embodiments provide for transitioning between the first and second carriers. Some embodiments provide for performing a transition to utilizing the first and second carriers.

Flexible bandwidths systems may involve wireless communications systems that utilize portions of spectrum that may not be big enough to fit a normal waveform utilizing flexible waveforms. A flexible bandwidth system may be generated with respect to a normal bandwidth system through dilating, or scaling down, the time or the chip rate of the flexible bandwidth system with respect to the normal carrier bandwidth system. Some embodiments increase the bandwidth of a flexible waveform through expanding, or scaling up, the time or the chip rate of the flexible carrier bandwidth system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA20001x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 herein is identified as 110-*a*, 110-*b*, or 110-*c*. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmission, from a mobile device 115 to a base station 105, and/or downlink and/or forward link transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

In some embodiments, the different aspects of system 100, such as the mobile devices 115, the base stations 105, the core network 130, and/or the controller 120 are configured for separating the signaling and the traffic and/or network data into different carriers, which may be flexible. This may result in capacity boosting. In some cases, the assigned resources can be customized to the traffic pattern as a result of the separation. Some of the mobile devices 115 and/or base stations 105 may be configured to receive signaling data over a first carrier and then to transition from receiving signaling data over the first carrier to transmitting and/or receiving traffic data over a second carrier. The traffic data may correspond to the signal data in some cases. The first carrier may carry information regarding the second carrier. In some embodiments, the signaling data is received over the first carrier separate from any other traffic data. For example, the signaling data may be received over the first carrier without any other traffic data.

Some of the mobile devices 115 and/or base stations 105 may be configured to scale a bandwidth of the first carrier utilizing a first scaling factor and scale a bandwidth of the second carrier utilizing a second scaling factor. The first scaling factor and the second scaling factor may be the same or different. The scaling factor may be unity. The scaling factors may be associated with specific flexible bandwidths. Some of the mobile devices 115 and/or base stations 105 may dynamically adjust at least the first scaling factor or the second scaling. Adjusting at least the first scaling factor or the second scaling factor dynamically may include adjusting at least the first scaling factor or the second scaling factor based upon expected traffic demand.

Some embodiments may include mobile devices 115 and/or base stations 105 that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interruption rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
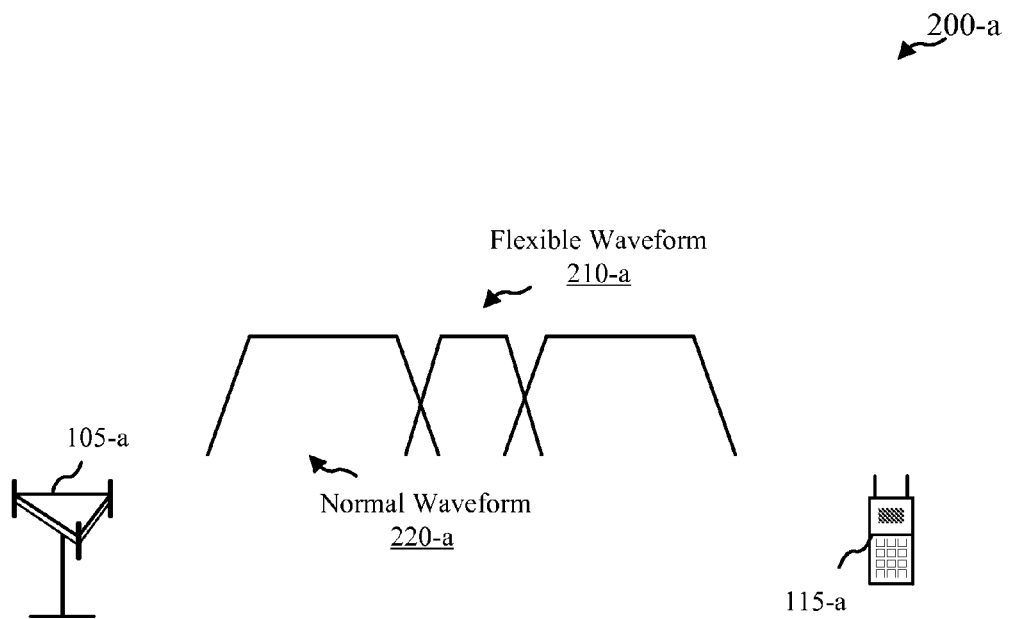
FIG. 2A shows an example of a wireless communications system where a flexible waveform fits into a portion of spectrum not broad enough to fit a normal waveform in accordance with various embodiments.
Figure 2B:
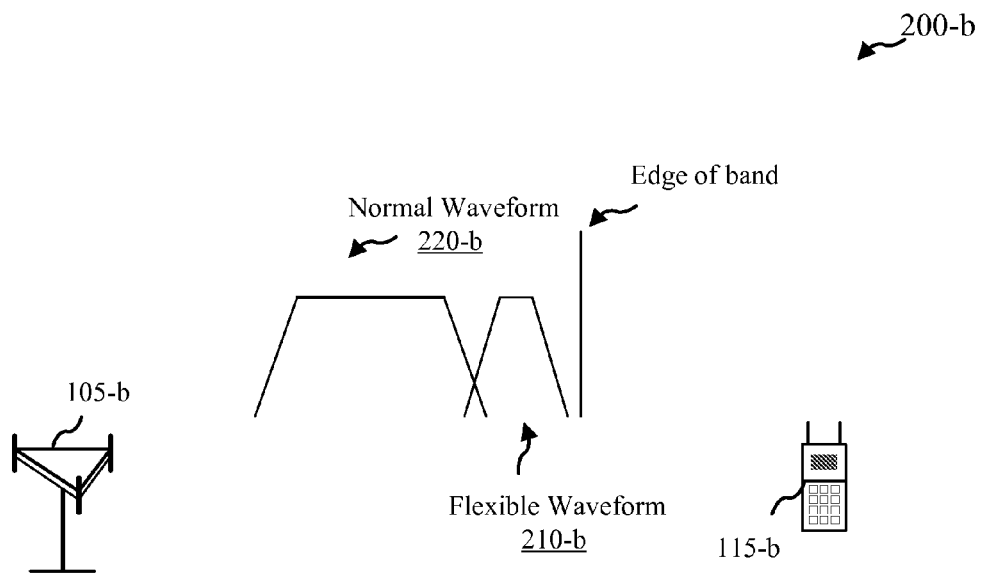
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a mobile device 115-a in accordance with various embodiments, where a flexible waveform 210-a fits into a portion of spectrum not broad enough to fit a normal waveform 220-a. Some embodiments may also utilize multiple flexible waveforms 210. In some embodiments, another base station and/or mobile device (not shown) may transmit the normal waveform 220-a and/or the flexible waveform 210-a. In some embodiments, the mobile device 115-a and/or the base station 105-a may be configured to separate the signaling and the data traffic into different carriers of flexible waveform 210. In some cases, this may be utilized so that assigned resources can be customized to different traffic patterns. FIG. 2B shows an example of a wireless communications system 200-b with a base station 105-b and mobile device 115-b, where a flexible waveform 210-b fits into a portion of spectrum near an edge of a band, which may be a guard band, where normal waveform 220-b may not fit. In some embodiments, the mobile device 115-b and/or the base station 105-b may be configured to separate the signaling and the data traffic into different carriers, which may utilize flexible waveform 210-b.

Figure 3:
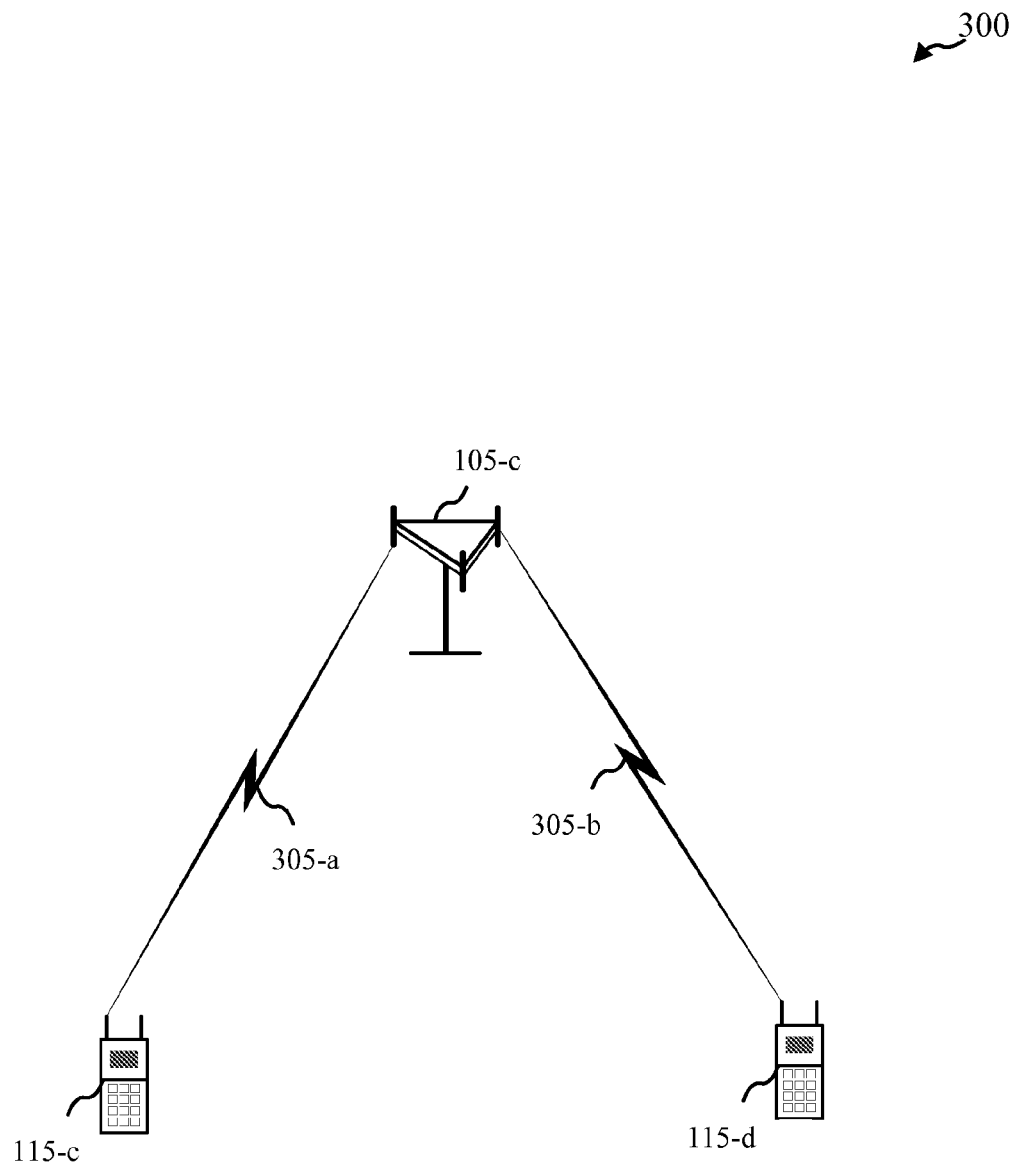
FIG. 3 shows a block diagram of a wireless communications system in accordance with various embodiments.

FIG. 3 shows a wireless communications system 300 with a base station 105-c and mobile devices 115-c and 115-d, in accordance with various embodiments. For example, some of the mobile device 115-c, the mobile device 115-d and/or the base station 105-c may be configured to separate the signaling and the data traffic into different carriers, which may utilize flexible waveform 210 in some cases. In some embodiments, the mobile device 115-c, the mobile device 115-d, and/or the base station 105-c may be configured for boosting capacity in wireless communications system 300. Transmissions 305-a and/or 305-b may thus include transmissions where the signaling and/or data traffic are separated into different carriers. Some of the mobile devices 115 and/or base stations 105 may be configured to receive signaling data over a first carrier and then to transition from receiving signaling data over the first carrier to receiving and/or transmitting traffic data over a second carrier. In some embodiments, the signaling data may be received over the first bandwidth separate from any other traffic data. For example, the signaling data may be received over the first carrier without any other traffic data.

Some of the mobile device 115-c, the mobile device 115-d and/or the base station 105-c may be configured to scale a bandwidth of the first carrier utilizing a first scaling factor and scale a bandwidth of the second carrier utilizing a second scaling factor. The first scaling factor and the second scaling factor may be the same or different. The scaling factors may be associated with specific flexible bandwidths. Some of the mobile device 115-c, the mobile device 115-d and/or the base station 105-c may be configured to dynamically adjust at least the first scaling factor or the second scaling factor. Adjusting at least the first scaling factor or the second scaling factor dynamically may include adjusting at least the first scaling factor or the second scaling factor based upon expected traffic demand.

Transmissions 305-*a* and/or 305-*b* between the mobile device 115-*c*/115-*d* and the base station 105-*a* may utilize flexible waveforms that may be generated to occupy less bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may take on numerous different values including, but not limited to, integer values such as 1, 2, 4, etc. N, however, does not have to be an integer.

Some embodiments may utilize additional terminology. A new unit D may be utilized. The unit D is dilated. The unit is unitless and has the value of N. One can talk about time in the flexible system in terms of "dilated time." For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds." Note frequency in Hertz is 1/s.

Some embodiments may include methods, systems, and/or devices for boosting capacity in wireless communications networks, including flexible bandwidth networks. The flexible bandwidth (FB) networks may lead to reduced data rate on the signaling channels. This may lead to reduced paging and/or broadcast capacity in the cell that could cause a problem for machine to machine (M2M) type applications where the number of devices in the network is expected to be high (e.g., in the millions). Mobile devices may experience an increase in delay in acquiring paging, broadcast messages, and/or data channel due to time stretching by flexible bandwidth scaling factor, N (especially for high N, e.g., N=16). Capacity boosting may include boosting signaling capacity, traffic capacity, network capacity, and/or paging capacity.

Figure 4:
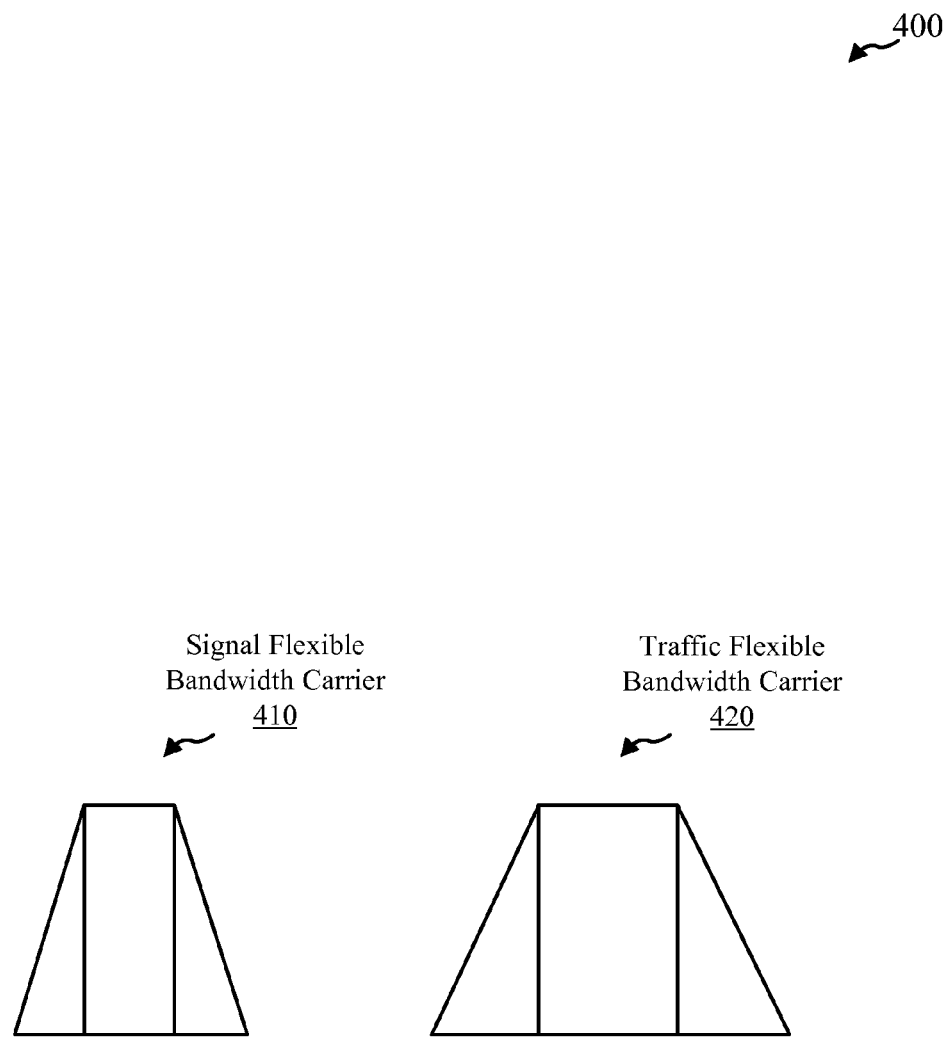
FIG. 4 shows an example of a signal flexible bandwidth carrier and a traffic flexible bandwidth carrier in accordance with various embodiments.

Some embodiments may address these issues through separating the signaling and the data traffic into different flexible bandwidth carriers so that assigned resources can be customized to the traffic pattern. FIG. 4 shows a spectrum diagram 400 separating signaling and data traffic into different flexible bandwidth carriers, including a signal flexible bandwidth carrier 410 and a traffic flexible bandwidth carrier 420, in accordance with various embodiments. The signaling carrier may include broadcast channel and/or paging channel information in some embodiments. Synchronization channel and/or pilot channel information may be included on the signaling flexible bandwidth carrier. The signaling carrier may also include information such as cell configuration parameters, pages, and/or operator specific information that may or may not be needed for traffic data transmission on the first bandwidth carrier; this signal data may be referred to as network data in some cases. A traffic flexible bandwidth carrier may include traffic and/or control data to assist traffic. In some embodiments, the traffic flexible bandwidth carrier may include pilot channel and/or synchronization information. While the examples provided generally discuss a signaling flexible bandwidth carrier and/or a traffic flexible bandwidth carrier, some embodiments may also include separating signaling and data traffic into different bandwidth carriers that may also include normal bandwidth carriers.

FIG. 5A shows an example 500-*a* where signaling and traffic may be combined. Combined signaling and traffic 510 shows a normal, or N=1, bandwidth system; combined signaling and traffic 515 shows a flexible bandwidth system, where N>1 in this example. In these two cases, the signaling and traffic information may be carried using 1 and K−1 codes, respectively. FIG. 5B shows an example 500-*b* of splitting signaling and traffic in accordance with various embodiments. Example 500-*b* shows the use of flexible bandwidth, where N>1. In this example, the signaling may be carried using codes 520-*l*, . . . , 520-*k*. since K codes may be assigned to signaling. FIG. 5A and FIG. 5B show that if the transmission time of a packet in a non-flexible bandwidth system takes T ms (using one code for transmission), when the same packet is transmitted in a flexible bandwidth system with scale factor N, then the transmission takes N×T ms. When the signaling and data carriers are separated so that k codes can be assigned to signaling, then the transmission time of the same packet may be reduced to N×T/k ms. While FIG. 5B show an example based on a frame or slot structure, some embodiments may be implemented based on a message structure. Similar analogies can be done for time (e.g., in CDMA2000 1XEV-DO) or frequencies (e.g., LTE) instead of codes.

Separating the signaling and the data traffic into different carriers, such as flexible bandwidth carriers, may provide different benefits. For example, embodiments may increase the signaling capacity available in each flexible bandwidth carrier since previously reserved and/or unallocated codes, time slots, and/or frequencies bins for traffic can now be allocated solely to signaling. Likewise, traffic capacity available in each flexible bandwidth carrier may increase since previously reserved and/or unallocated codes, time slots, and/or frequencies bins for signaling can now be allocated solely to traffic. Embodiments may provide for decreasing the flexible bandwidth mobile device's waiting time in acquiring signaling and/or traffic (e.g., by a factor of K, where K is the number of freed-up channels previously for signaling or traffic). Embodiments may decrease mobile devices' waiting time leading to reduced power consumption. Embodiments may enable appropriate selection of N for all mobile device states (e.g., signaling, very small packets (e.g., sent in the UMTS RRC CELL_FACH state) or larger packets (e.g., sent in the UMTS RRC CELL_DCH)). A UMTS Release 99 mobile device can either be in the idle mode (which may be referred to as IDLE mode in some cases) or connected mode, for example.

An idle state may be a user state where no dedicated core network and radio resources are generally available to the mobile device, however, common resources may be used by the network in sending messages such as broadcast system information and pages to the mobile device. The mobile device's location may only be known to the network and not individual carriers or cells. In this state, the mobile device may be paged by the network to request radio resources when there is a mobile terminated call for the mobile device. To receive these pages, the mobile device can monitor the paging channel transmitted in a paging occasion every discontinuous reception (DRX) cycle. In IDLE mode, the DRX cycle may range between 640 ms and 5120 ms. In addition to paging channel monitoring, the mobile device also may perform functions such as periodic channel measurements, timing and frequency acquisition, inter-frequency and intra-frequency searches, inter-RAT searches, USIM polling, transmission of periodic location updates, etc.

The connected mode may include four states, such as, the URA_PCH/CELL_PCH, CELL_FACH and CELL_DCH. The network may transition the mobile device to the URA_PCH and CELL_PCH after a significant period of inactivity in CELL_DCH or CELL_FACH. The transition delay from these states back to CELL_DCH/CELL_FACH may be much lower than IDLE so these RRC states are used when the mobile device is expected to communicate with the network after some period of inactivity. The mobile device functions in these states may be similar to the IDLE state because the mobile device only monitors paging during paging occasions and does not perform any uplink transmissions. However, unlike the IDLE state, the mobile device may have radio resources which are assigned but preserved. In addition, the mobile device location may be known to the resolution of the cell in the CELL_PCH while in the URA_PCH, the mobile device is known on the UTRAN registration area (URA) level to the core network.

The CELL_FACH and CELL_DCH are two states where the mobile device can actively transmit and receive data from the network. In the CELL_FACH state, the mobile device and network may use common resources shared by other mobile devices in the cell while in CELL_DCH, dedicated resources assigned to mobile devices are used for communication. Unlike the URA_PCH, CELL_PCH and IDLE states where the mobile device monitors channels only during the paging occasions, in the CELL_FACH and CELL_DCH, the mobile device may continuously monitor data and control channels in WCDMA/HSPA Release 6 and earlier releases.

In some embodiments, different carriers can be mapped to different mobile device states. For example, in LTE, signaling carriers can be used for idle mode and traffic carriers used for connected mode especially. In UMTS, for example, different carriers can be used to carry data in the IDLE, CELL_FACH, CELL_DCH, URA_PCH and/or CELL_PCH modes. In some embodiments, IDLE and/or URA_PCH/CELL_PCH can be carried in the same signaling carrier (these are states where the mobile device may be receiving information from the network but not transmitting) and the CELL_DCH and/or CELL_FACH states (states where the mobile device may be actively transmitting and receiving data from the network) can be carried in the same traffic carrier.

In some embodiments, the Ns for the signaling and/or traffic carrier may be adjusted based on the expected traffic demand on the network. The signaling and traffic flexible carriers can have the same or different Ns (e.g., signaling flexible bandwidth carrier can use flexible bandwidth scaling factor, N=4, and the traffic flexible bandwidth carrier can use flexible bandwidth scaling factor, N=2). Multiple traffic flexible bandwidth carriers can share the signaling flexible bandwidth carrier. Signaling and traffic carriers Ns and frequencies can be selected to mitigate interference within a site or between adjacent sites.

While examples may be provided that utilize WCDMA and it terminology, separating signaling and traffic into different carriers, which may include flexible bandwidth carriers, can be applied to cellular technologies including, but not limited to, 1x, EV DO, LTE, FDD, TDD, TD-LTE, TD-SCDMA, TD-CDMA, etc. Furthermore, some embodiments may include a TDD system where typically one carrier is used to support both downlink and uplink transmissions. In this case, for both uplink and downlink transmissions, the signaling and data traffic information may be carried on separate carriers. In some embodiments, one of the carriers may be a FDD and the other may be a TDD (e.g., for downlink signaling). Furthermore, while embodiments are generally described where a signaling carrier and/or a traffic carrier may be flexible carriers, some embodiments may include signaling carriers and/or traffic carriers that may utilize normal carriers.

Merely by way of example, a mobile device may perform several different operations in relation to utilizing signaling flexible bandwidth carriers and traffic flexible bandwidth carriers. For example, a mobile device may power on and listen to a signaling flexible bandwidth carrier. In some cases, a mobile device may not realize when it is camping on a carrier that the carrier may be a signaling carrier. The mobile device may get system information that may include broadcasted system information to enable the mobile device to operate in idle mode). The mobile device may then register with the network using the signaling flexible bandwidth carrier. The mobile device may listen for pages and monitor other signaling and/or traffic flexible bandwidth carriers. While camping on the signaling carrier, the mobile device may receive a page or may want to originate a call in some cases so the mobile device may read the connected mode system information for specific information on how to access a selected flexible bandwidth traffic carrier. The mobile device may tune to the flexible bandwidth traffic carrier which supports CELL_FACH/CELL_DCH and may request radio resources on the traffic channel in order to make and/or receive calls. On the traffic carrier, the mobile device may transmit and/or receive packet data or voice data on the flexible bandwidth carrier and may also request and/or receive assistance data for accessing the next carrier (e.g., timing information about the signaling flexible bandwidth carrier) it intends to transition to when the call is completed. Once the call is completed, the mobile device may release the core network resources (i.e., bearers), and the mobile device may re-select to and camp on a signaling flexible bandwidth carrier (supporting IDLE mode). This example is for a UMTS WCDMA Release 99 scenario where the signaling carrier may support only the idle mode and the traffic carrier supports the CELL_FACH/CELL_DCH states. Some embodiments may utilize other states, divisions and/or groups (e.g., certain classes of overhead messages, paging, etc.).

Some embodiments may be implemented utilizing UMTS. Normal UMTS carriers today support all mobile device states in the same carrier (i.e., normal UMTS carrier=IDLE+CELL_FACH+CEL_PCH+CELL_DCH). In some embodiments, different signaling and traffic carriers providing support for these configurations is possible. For example, signaling may occur on the signaling carrier. In some embodiments, the IDLE, URA_PCH and CELL_PCH may be supported in separate signaling carriers; the CELL_FACH and CELL_DCH states may also be supported in separate traffic carriers. In some embodiments, the signaling carrier may include both IDLE and CELL_PCH/URA_PCH; the traffic carrier may also include both CELL_DCH and CELL_FACH states.

Some embodiments may include signaling and small packet transmission (especially for NAS mobility such as registration) on the signaling carrier. In those cases, a signaling carrier may include both IDLE and CELL_FACH states or both CELL_PCH/URA_PCH and CELL_FACH; the traffic carrier may include the CELL DCH, CELL_FACH, or both CELL_DCH and CELL_FACH states. In some embodiments, the signaling carrier may include IDLE, CELL_FACH and CEL_PCH/URA_PCH; the traffic carrier may include CELL_DCH, CELL_FACH, or CELL_DCH and CELL_FACH. Note that even though the signaling carrier may support CELL_FACH, the resources dedicated to the CELL_FACH state may be minimal compared to the IDLE/CELL_PCH states. Therefore, there could be other traffic carriers with CELL_FACH or CELL_DCH that the mobile device can migrate to to transmit medium to high data rate transmissions.

FIG. 6A shows a table 600-a reflecting WCDMA required Rel'99 channels in UE state 610, UE states 605 in relation to possible flexible bandwidth (FB) carrier assignments 620, along with channel functions 615, in accordance with various embodiments. FIG. 6B shows a table 600-b reflecting the freed-up channels 630 that may result for separating signaling and traffic data, along with the related UE states 625 and/or flexible bandwidth (FB) carriers 635, in accordance with various embodiments. Mobile device (referred to as user equipment (UE) in these examples) states may correspond to different flexible bandwidth assignments with regard to signaling and/or traffic. Note that in the table 600-b, Embodiment I may refer to the scenario where the signaling flexible bandwidth carrier may support the IDLE, CELL_PCH or URA_PCH states only. Embodiment II may refer to the scenario where the signaling flexible carrier may support the CELL_FACH state in addition to the IDLE or CELL_PCH/URA_PCH states.

For example, the IDLE mobile device state may include the signaling carrier in accordance with various embodiments. Different channels in the mobile device state may be utilized including P-CCPCH, PICH & S-CCPCH, P-SCH & S-SCH, and/or CPICH. The P-CCPCH channel may include broadcasted system information like N, frequency, timing information of other signaling and traffic carriers, network load on those carriers, etc. Page indications may be sent in the PICH, and S-CCPCH and may be dedicated to pages as opposed to sharing between small packets and pages as done in existing Rel'99 systems. CPICH may carry pilots that may be required for synchronization and data demodulation. In some embodiments (e.g., Embodiment II), the PRACH & S-CCPCH for small packets may be added for mobile device registration, tracking updates, and/or small packet transmissions.

The CELL_FACH state may be supported in signaling and/or traffic carriers. Different channels in this mobile device state may be utilized, including PRACH, AICH & S-CCPCH, P/S-SCH, and/or CPICH. PRACH, AICH & S-CCPCH may be required for random access small packet transmissions with FACH. When the CELL_FACH is supported in the traffic flexible bandwidth carrier, P/S-SCH channels might be required depending on the quality of the timing information received from other carriers and/or the timing information derived from the pilots. CPICH can carry pilots that may be required for synchronization and data demodulation. Broadcast information in this state could be sent directly to a mobile device in the traffic CELL_FACH carrier.

The CELL_DCH state may include traffic carriers. Different channels in the mobile device state may be utilized including DPCCH & DPDCH, P-SCH/S-SCH, and/or CPICH. DPCCH & DPDCH carriers may include the control and/or data information. P-SCH/S-SCH might be required for the same reason as in the CELL_FACH state. CPICH might not be required if the pilots in the DPDCH allow adequate data demodulation.

The URA_PCH/CELL_PCH states may be supported in the signaling carriers. Different channels in this mobile device state may be utilized, including P-CCPCH, PICH/S-CCPCH, and/or CPICH. The channels required may be the same as in the idle mobile device state. Note that radio resources may be preserved as the mobile device moves from a traffic carrier supporting CELL_FACH/CELL_DCH to a signaling carrier supporting URA_PCH/CELL_PCH.

Some embodiments may be configured for transitioning from the signaling carrier to the traffic carrier. For example, mobile devices may camp on signaling carriers for an extended period of time. Mobile devices may camp on the signaling carrier and monitor other carriers to facilitate mobility. Mobile devices may monitor either other signaling or traffic carriers. Mobile devices may monitor other signaling flexible bandwidth carriers in case the mobile device loses connection with the current signaling flexible bandwidth carrier. Mobile devices may monitor other traffic flexible bandwidth carriers in case the mobile device may desire to start a mobile originated (MO)/mobile terminated (MT) call. Selection of which traffic flexible bandwidth cells to measure may be dependent on the N supported by carrier, carrier network load, and/or the mobility of the mobile device and not necessarily on the signal quality measured on those carriers as done in existing designs.

The information about potential signaling and traffic carriers may be signaled to the mobile devices through broadcast information on the system information blocks. The network may redirect the mobile device through a redirection message attached to a page instructing the mobile device to move to a particular traffic and/or signaling carrier for reasons such as based on subscription and device capability. Such redirection messages may include the N and timing info of the carriers. In some embodiments, the mobile device could be provisioned with carrier information (e.g., which signaling carrier to camp on).

Some embodiments may be configured for transitioning from the traffic carrier to the signaling carrier. For example, the mobile device may be transmitting data or observing an inactive period on the traffic carrier. A radio connection may be present between the mobile device and the network. In this scenario, some embodiments include a non-monitoring mode. To avoid the performance degradation that comes from the mobile device tuning away to measure other channels during data transmission, a mobile device could be allowed to not monitor other channels. However, before the radio connection is released, the traffic carrier can provide information to the mobile device on which signaling and/or traffic carrier to transition to next. This mode may not be recommended for non-stationary mobile devices.

Some embodiments may include a monitoring mode. For example, mobile devices may monitor other signaling and/or traffic carriers while operating on the traffic carrier by tuning away for a brief period or during periods of data inactivity. The mobile device may obtain information about carriers to monitor through: broadcasted system information while camping on a previous signaling carrier; dedicated information from current traffic carrier; and/or provisioned carrier information in the mobile device. Some embodiments may include periodic monitoring.

Figure 7A:
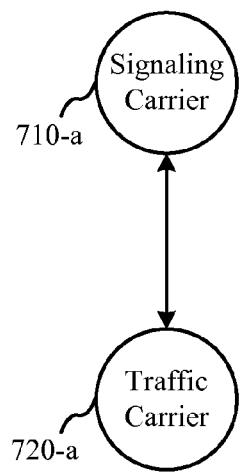
FIGS. 7A, 7B, 7C, 7D, and 7E show different examples of signal carriers providing information to different traffic carriers in accordance with various embodiments.
Figure 7B:
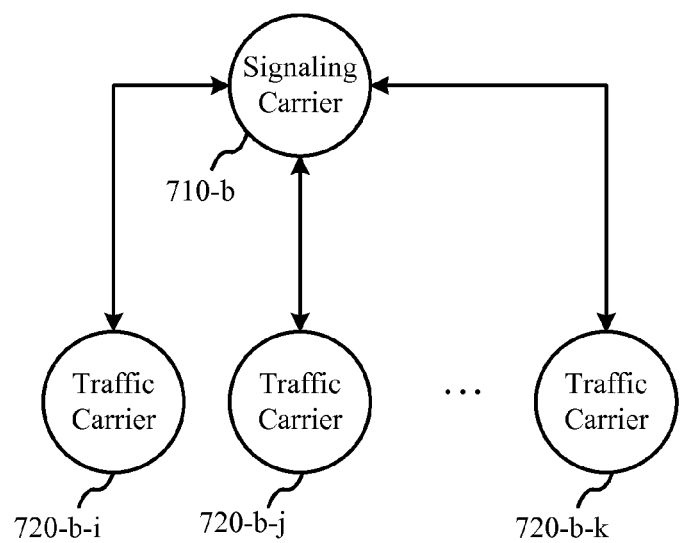
Figure 7C:
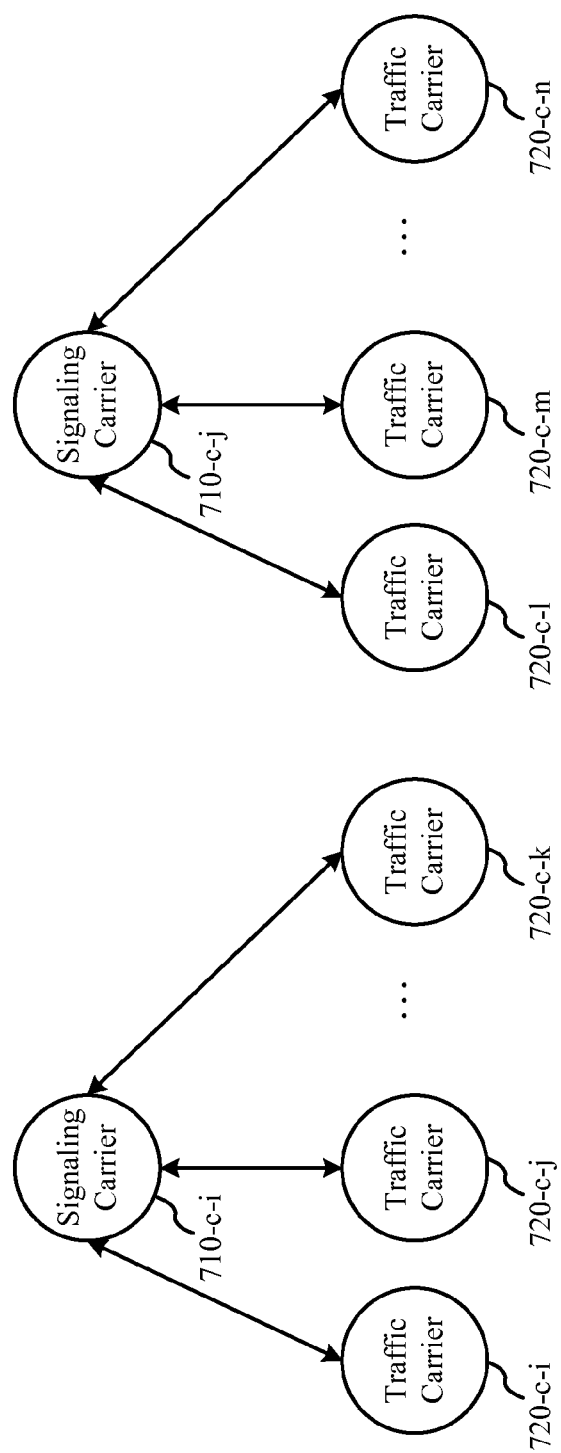
Figure 7D:
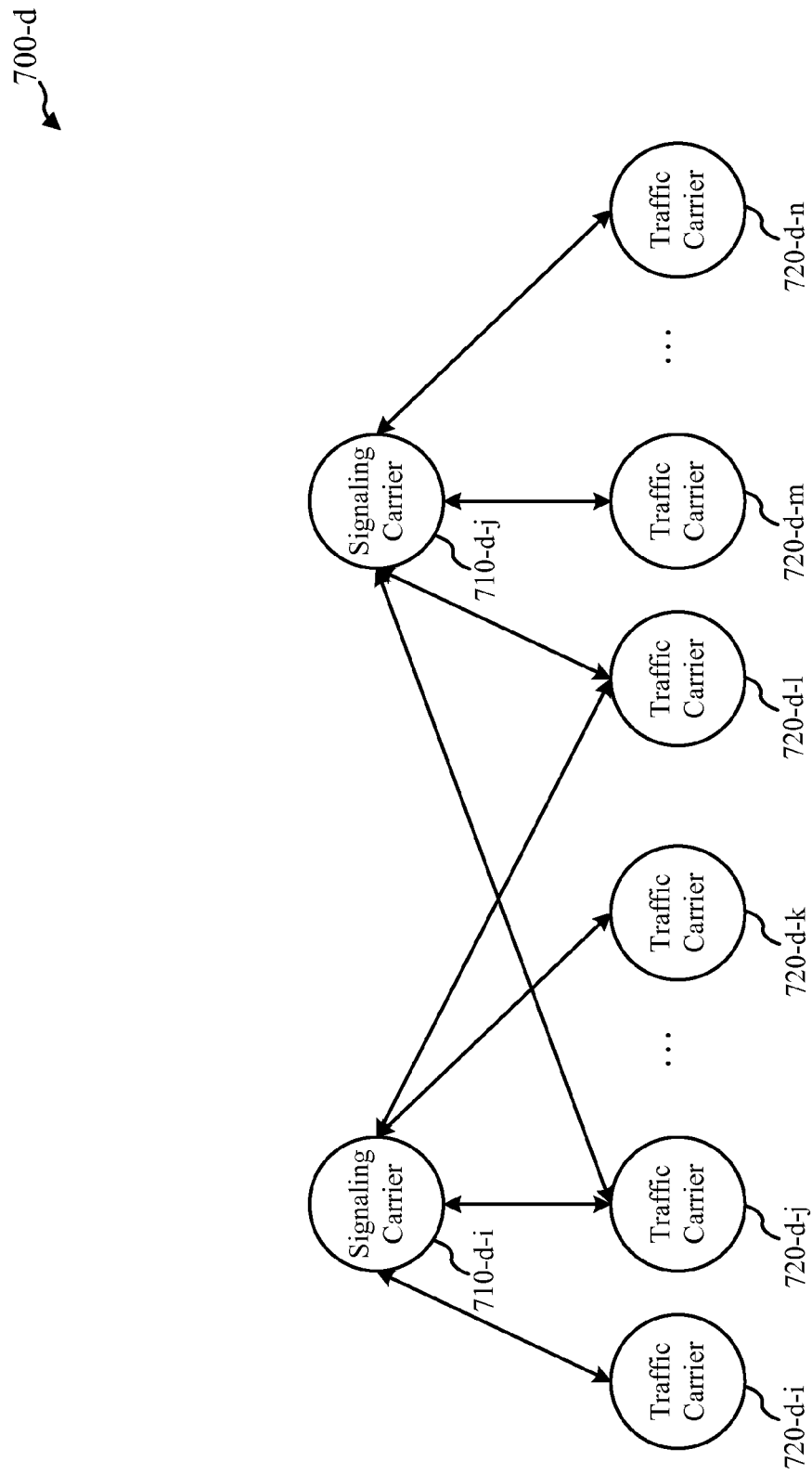
Figure 7E:
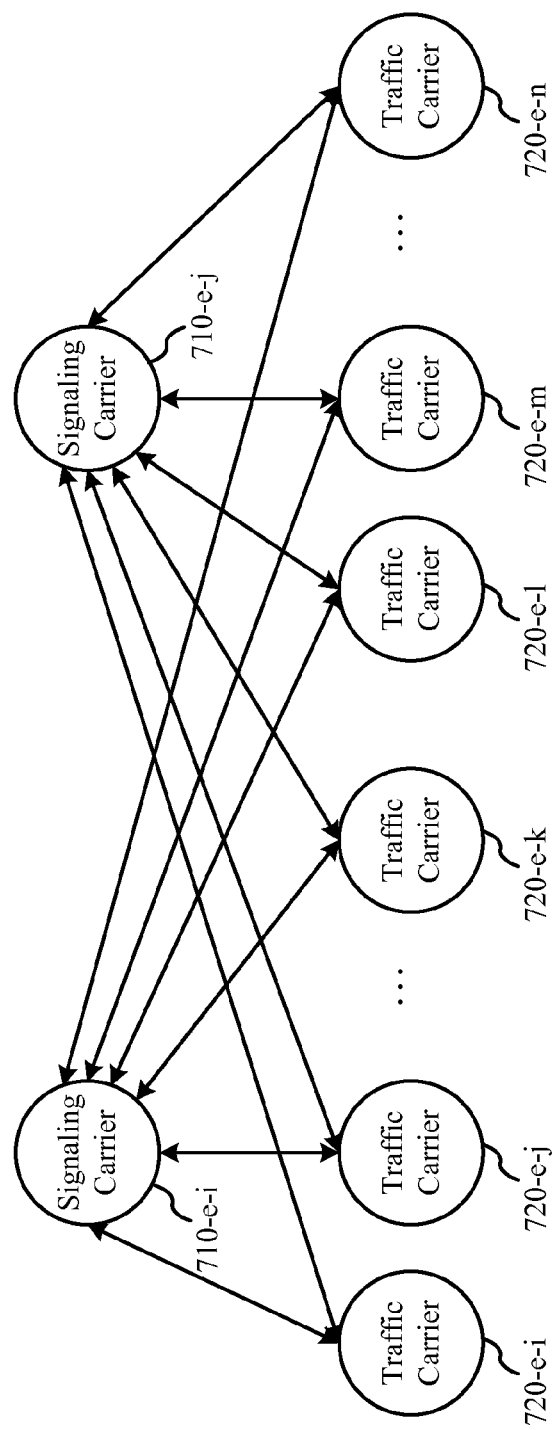

Some embodiments may include information sharing between signaling carriers and traffic carriers. To support mobility procedures, the signaling carriers can carry information for one or multiple traffic carriers. FIG. 7A shows an example 700-a of one signaling carrier 710-a providing information regarding one traffic carrier 720-a and in this case, the traffic carrier may provide information about the signaling carrier to mobile devices on the traffic carrier. FIG. 7B shows an example 700-b of one signaling carrier 710-b providing information regarding multiple traffic carriers 720-b-i, 720-b-j, 720-b-k. In this case, each of these multiple traffic carriers may also provide information about the signaling carrier to mobile devices on the carriers. FIG. 7C shows an example 700-c of two signaling carriers 710-c-i, 710-c-j that provide information to mobile devices about the different sets of non-overlapping traffic carriers 720-c-i, 720-c-j, 720-c-k, 720-c-l, 720-c-m, 720-c-n. In this case, while the signaling carrier 710-c-i/710-c-j may provide information about the respective traffic carriers and its respective traffic carriers may provide information about the signaling carrier 710-*c-i*/ 710-*c-j*, both signaling carriers may not share information. Likewise, the two sets of traffic carriers may not share information with each other also. FIG. 7D shows an example 700-*d* of two signaling carriers 710-*d-i*, 710-*d-j* that provide information to mobile devices about some independent traffic carriers 720-*d-i*, 720-*d-k*, 720-*d-m*, 720-*d-n* and some common traffic carriers (i.e., partial overlapping) 720-*d-j*, 720-*d-l*. In this case, the common traffic carriers may provide information about both signal carriers 710-*d-i* and 710-*d-j* while the independent traffic carriers may provide information about their corresponding signaling carriers. FIG. 7E shows an example 700-*e* of two signaling carriers 710-*e-i*, 710-*e-j* that provide information to mobile devices about the same set of traffic carriers (i.e., total overlap) 720-*e-i*, 720-*e-j*, 720-*e-k*, 720-*e-l*, 720-*e-m*, 720-*e-n*. In this case, all signaling and traffic carriers may share information about all the other signaling and traffic carriers with mobile devices. The arrows in FIG. 7 show the flow of carrier information between the signaling and traffic carriers. Information may include N (channel bandwidth), scrambling codes, carrier timing information, etc. In some cases, a carrier may be a signaling carrier or a traffic carrier at different instances in time. This may depend on network configurations, loads, etc.

The signaling and traffic carriers can operate on the same or different N values and with multiple traffic carriers, the N configuration could be different. The deployment of the carriers may be such that while on a signaling carrier the mobile device may be able to access at least one of the traffic carriers.

Some embodiments may include grouping that uses virtual location areas and/or routing areas. For example, to enable carrier information to flow between signaling and traffic carriers, the carriers can be grouped into virtual location areas (LA) and/or routing areas (RA) with the same LA/RA ID. For example, signaling and traffic carriers in the same LA/RA may have information about the signaling and traffic carriers in that location area. Some bordering carriers could have information about the signaling and/or traffic carriers in another LA/RA for mobility management reasons.

Some embodiments may include information sharing. Information sharing may occur between signaling carriers. For example, a signaling carrier can carry information about other signaling carriers with or without the same N. A signaling carrier may carry information about other signaling carriers in the same geographical location because of the possibility of mobile device movement within that area. A signaling carrier that is overloaded may offload to other signaling carriers in its geographical area.

Some embodiments may include information sharing between traffic carriers. A traffic carrier may carry information about other traffic carriers in the same geographical location because of the possibility of mobile device movement within that area. A traffic carrier may carry information about other traffic carriers within the same N.

Embodiments utilizing signaling and traffic carrier separation for flexible bandwidth may have numerous differences from known techniques. For example, embodiments may result in increased paging and system information (SI) capacity of the flexible carrier. Some embodiments may include signaling forward link only transmissions in a signaling carrier, which may include paging and broadcast SI only. Some embodiments may include signaling and small packet traffic, which may include forward link and uplink (for registration only) in a signaling carrier. Some embodiments may include signaling carriers for NAS mobility and security but no Radio Resource Control (RRC) maintenance. Some embodiments may include carriers that are dedicated for traffic only (no broadcast traffic may be sent on these carriers).

Some embodiments may include protocol changes with minimal or no impact above the RRC for the signal plane and RLC for user plane. Some embodiments may impact mobile device states, such that mobile devices in all the RRC states may be affected. Some embodiments may include transitions such that RRC resources may be released on the signaling carrier after registration and tracking area updates; mobile devices may be in the IDLE or CELL_PCH/URA_PCH state before transitioning to the traffic carrier. Information regarding data traffic carrier may be conveyed to a mobile device as broadcast message in the SIBs and/or appended to a page in some embodiments.

In some embodiments, recommendations for activation, deactivation, and/or reconfiguration of the traffic carrier may be sent to the mobile device through page messages; in other cases, the mobile device may be responsible for determining the best carrier based on applications, power savings, and/or signal quality. The mobile device may be either be associated with the signal carrier or the traffic carrier but not to both carriers at the same time. A mobile device's disassociation from a signaling carrier may involve the mobile device moving to the traffic carrier based on MT or MO calls. Transitioning from the signaling carrier to another signaling carrier may involve an idle mode reselection procedure. In some embodiments, transitioning from one traffic carrier to another when the mobile device is in the connected mode happens through handovers.

In some embodiments, discontinuous reception (DRX) procedures may be differently configured in the signaling carriers and the traffic carriers. For example, the DRX cycles in the signaling and traffic carriers can be configured independently.

Figure 8:
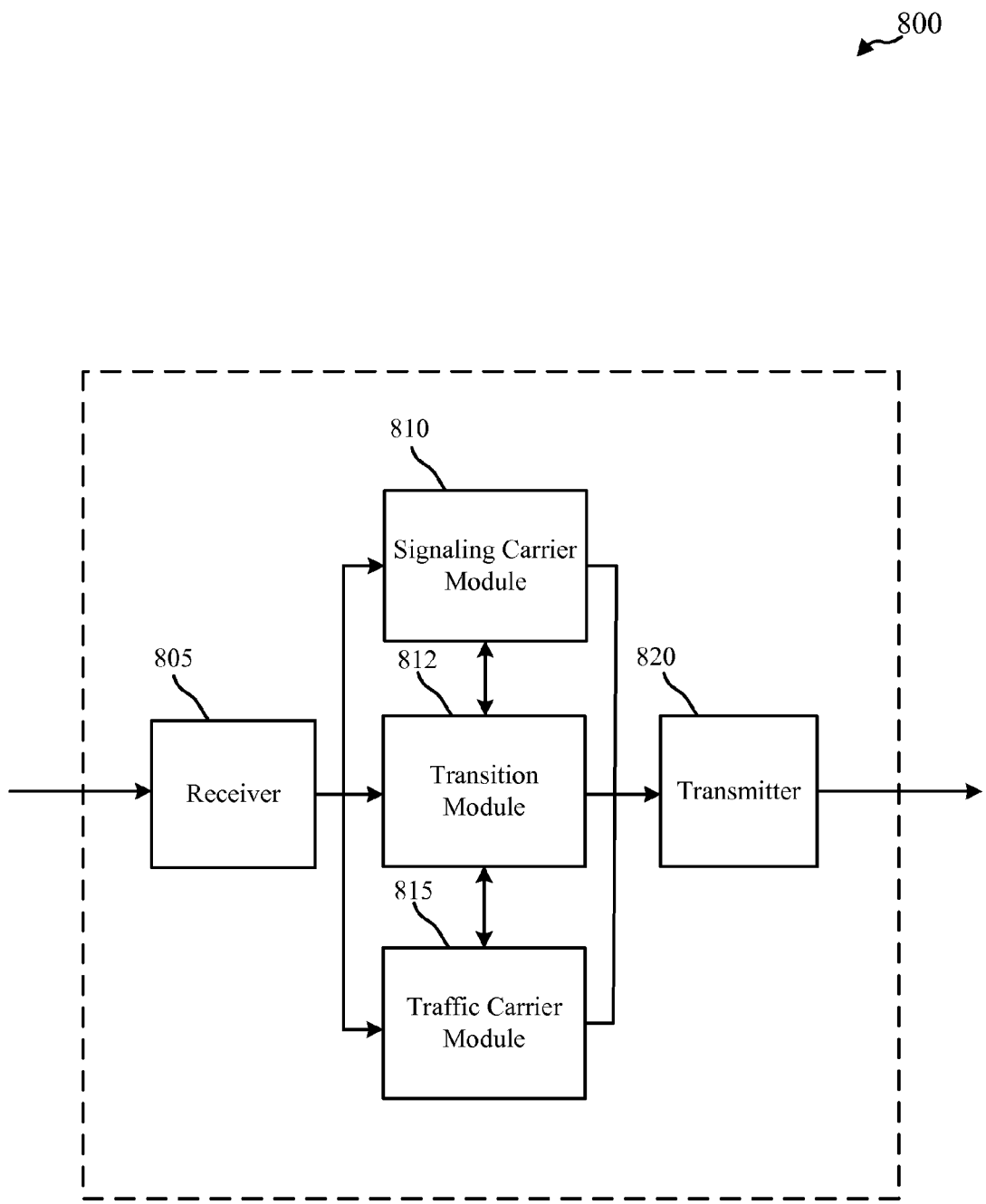
FIG. 8 shows a block diagram of a device that includes capacity boost functionality in accordance with various embodiments.

Turning next to FIG. 8, a block diagram illustrates a device 800 that includes signaling and traffic carrier splitting functionality. For example, the device 800 may be one of the mobile devices 115 described with reference to FIG. 1, FIG. 2A, FIG. 2B, FIG. 3, FIG. 9, FIG. 11, and/or FIG. 12. The device 800 may also be a processor. The device 800 may include a receiver module 805, a signaling carrier module 810, a transition module 812, a traffic carrier module 815, and/or a transmitter module 820. Each of these components may be in communication with each other.

These components of the device 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 805 may receive information such as packet, data, and/or signaling information regarding what device 800 has received or transmitted. The received information may be utilized by the signaling carrier module 810 and/or traffic carrier module 815 for a variety of purposes.

The signaling carrier module 810 may receive signaling data over a first bandwidth carrier. In some embodiments, the signaling carrier module 810 prepares mobile device registration message to be transmitted to the network. The transition module 812 may facilitate transitioning from receiving signaling data over the first carrier to receiving at least traffic data or network data at the traffic carrier module 815 corresponding to the signaling data over a second carrier may occur. This transitioning may involve obtaining information about the neighboring signaling and traffic carriers that the mobile device is monitoring from the signaling carrier and assessing the viability of those carriers (e.g., in terms of signal power) for future transition. In some embodiments, the signaling data may be received over the first carrier separate from any other traffic data. For example, the signaling data may be received over the first carrier without any other traffic data. The traffic carrier module 815 may be used for supporting the transmission and reception of traffic data when the mobile device is on the traffic carrier. The traffic carrier module 815 may also support receiving data from the network about neighboring cells that the mobile device might desire to evaluate for future transition. The evaluation may be performed in the transition module 812.

In some embodiments, the signaling carrier module 810, the transition module 812, and/or the traffic carrier module 815 may perform a transition to transmitting and/or receiving traffic data over the first carrier and transmitting and/or receiving signaling data over a second carrier. The transition module 812 may be configured to transition from at least transmitting or receiving traffic data over the second carrier to at least transmitting or receiving traffic data over a third carrier. The transition module 812 may be configured to transition from receiving signaling data over the first carrier to receiving signaling data over a fourth carrier. In some embodiments, the received signaling data may correspond to the traffic data. The first carrier may carry information regarding the second carrier.

Some embodiments include scaling a bandwidth of the first carrier utilizing a first scaling factor and scaling a bandwidth of the second carrier utilizing a second scaling factor utilizing the signaling carrier module 810, the transition module 812, and/or the traffic carrier module 815. The first scaling factor and the second scaling factor may be the same or different. At least the first scaling factor or the second scaling factor may be adjusted dynamically. Adjusting at least the first scaling factor or the second scaling factor dynamically may include adjusting at least the first scaling factor or the second scaling factor based upon expected traffic demand.

In some embodiments, at least the first carrier or the second carrier includes a flexible bandwidth carrier. The first carrier and the second carrier may utilize a common scaling factor. In some embodiments, at least the first carrier or the second carrier includes a normal bandwidth carrier.

The signaling carrier module 810, the transition module 812, and/or the traffic carrier module 815 may be configured to receive at least the traffic data or the signaling data in order to boost at least a signaling capacity, a traffic capacity, or a paging capacity. The signaling data may include at least broadcast messages (such as system information), paging, synchronization, or pilot data. The signaling data may include at least cell configuration parameters, pages, or operator specific information that may or may not be needed for traffic data transmission on the first bandwidth carrier. In some cases, signaling data may be referred to as network data. The traffic data may include at least user data or control information to assist the traffic data. In some embodiments, the first carrier is utilized for an idle mode and the second carrier is utilized for a connected mode.

In some embodiments, users within the first carrier and the second carrier are separated by at least codes, time, or frequency. Users on the first carrier may be separated differently from those on the second carrier. The users within the first carrier may be separated by time and the users on the second carrier are separated by frequency, for example. In some embodiments, the first carrier utilizes FDD and the second carrier utilizes TDD.

In some embodiments, the signaling carrier module 810, the transition module 812, and/or the traffic carrier module 815 are configured such that at least the first carrier or the second carrier separate forward link and reverse link transmissions utilizing at least codes, time, or frequency. The first carrier and/or the second carrier may separate forward link and reverse link transmissions in different ways.

Some embodiments may include receiving and/or transmitting traffic data over a third carrier utilizing the traffic carrier module 815. Signaling data may be received over the first carrier utilizing the signaling carrier module 810. In some cases, the signaling data may correspond to the traffic data. The first carrier may carry information regarding the second carrier and/or the third carrier. The third carrier may be a flexible bandwidth carrier. Some embodiments may include receiving and/or transmitting traffic data over a third carrier and transmitting signaling data over a fourth carrier. The fourth carrier may carry information regarding at least the first carrier and the second carrier; the second carrier may carry information regarding at least the first carrier or the second carrier.

Figure 9:
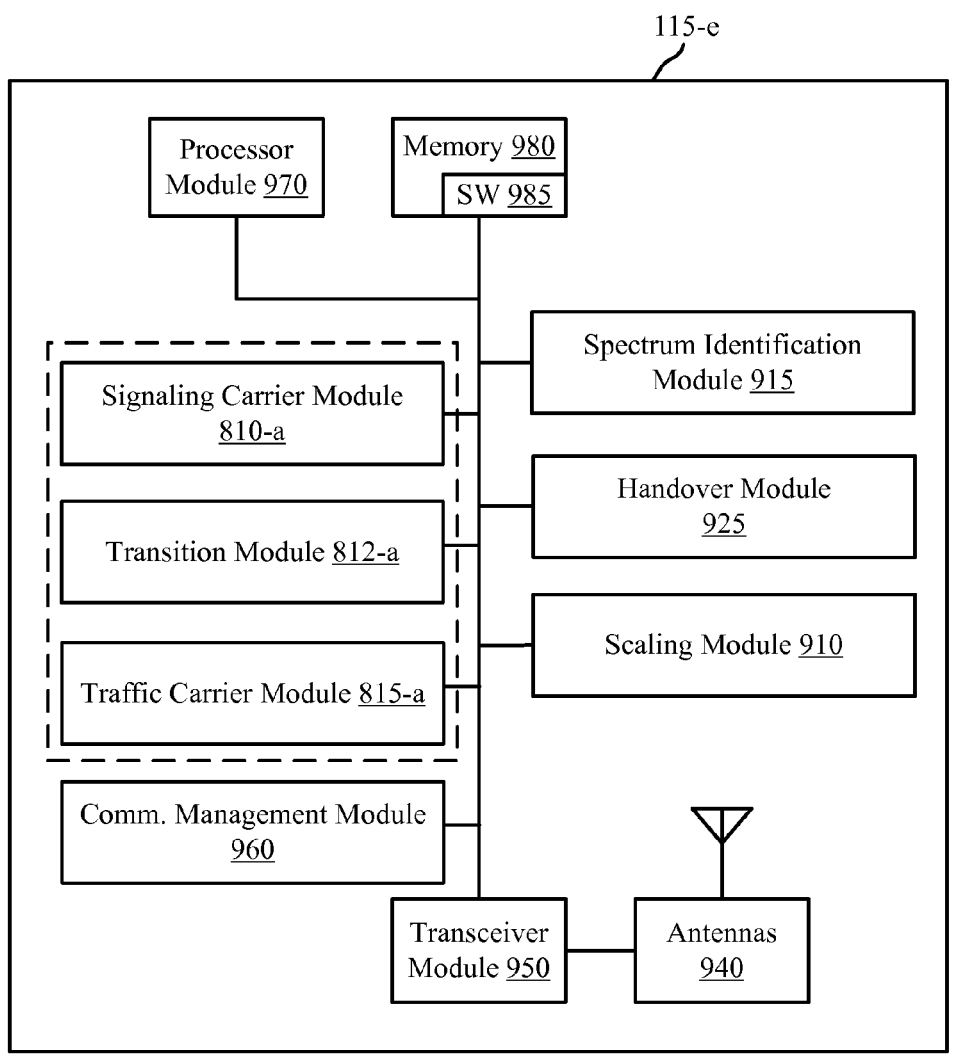
FIG. 9 shows a block diagram of a mobile device in accordance with various embodiments.

FIG. 9 is a block diagram 900 of a mobile device 115-*e* configured to facilitate signal and traffic carrier splitting in accordance with various embodiments. The mobile device 115-*e* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*e* may have an internal power supply (not shown), such as a small battery, to facilitate mobile operation. In some embodiments, the mobile device 115-*e* may be the mobile device 115 of FIG. 1, FIG. 2A, FIG. 2B, FIG. 3, FIG. 11, and/or FIG. 12, and/or the device 800 of FIG. 8. The mobile device 115-*e* may be a multi-mode mobile device. The mobile device 115-*e* may be referred to as a wireless communications device in some cases.

The mobile device 115-*e* may include antennas 940, a transceiver module 950, memory 980, and a processor module 970, which each may be in communication, directly or indirectly, with each other (e.g., via one or more buses). The transceiver module 950 is configured to communicate bi-directionally, via the antennas 940 and/or one or more wired or wireless links, with one or more networks, as described above. For example, the transceiver module 950 may be configured to communicate bi-directionally with base stations 105 of FIG. 1, FIG. 2A, FIG. 2B, FIG. 3, FIG. 11, and/or FIG. 12. The transceiver module 950 may include a modem configured to modulate the packets and provide the modulated packets to the antennas 940 for transmission, and to demodulate packets received from the antennas 940. While the mobile device 115-*e* may include a single antenna, the mobile device 115-*e* will typically include multiple antennas 940 for multiple links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., call processing, database management, message routing, etc.). Alternatively, the software code 985 may not be directly executable by the processor module 970 but be configured to cause the computer (e.g., when compiled and executed) to perform functions described herein.

The processor module 970 may include an intelligent hardware device, e.g., a central processing unit (CPU) such as those made by Intel® Corporation or AMD®, a microcontroller, an application-specific integrated circuit (ASIC), etc. The processor module 970 may include a speech encoder (not shown) configured to receive audio via a microphone, convert the audio into packets (e.g., 30 ms in length) representative of the received audio, provide the audio packets to the transceiver module 950, and provide indications of whether a user is speaking. Alternatively, an encoder may only provide packets to the transceiver module 950, with the provision or withholding/suppression of the packet itself providing the indication of whether a user is speaking.

According to the architecture of FIG. 9, the mobile device 115-e may further include a communications management module 960. The communications management module 960 may manage communications with other mobile devices 115. By way of example, the communications management module 960 may be a component of the mobile device 115-e in communication with some or all of the other components of the mobile device 115-e via a bus. Alternatively, functionality of the communications management module 960 may be implemented as a component of the transceiver module 950, as a computer program product, and/or as one or more controller elements of the processor module 970.

The components for mobile device 115-e may be configured to implement aspects discussed above with respect to device 800 in FIG. 8 and may not be repeated here for the sake of brevity. For example, the signaling carrier module 810-a may be the signaling carrier module 810 of FIG. 8. The traffic carrier module 815-a may be an example of the traffic carrier module 815 of FIG. 8. The transition module 812-a may be an example of the transition module 812 of FIG. 8.

The mobile device 115-e may also include a spectrum identification module 915. The spectrum identification module 915 may be utilized to identify spectrum available for flexible waveforms. In some embodiments, a handover module 925 may be utilized to perform reselection and handover procedures of the mobile device 115-e from one base station to another. For example, the handover module 925 may perform a handover procedure of the mobile device 115-e from signaling carrier to another signaling carrier, a traffic carrier to another traffic carrier and between a signaling and traffic carrier. The base stations supporting these carriers may utilize normal waveforms or flexible waveforms between the mobile device 115-e and base stations. In some embodiments, the transition module 812-a and/or the handover module 925 may be combined in one module. A scaling module 910 may be utilized to scale and/or alter chip rates to generate flexible waveforms.

In some embodiments, the transceiver module 950, in conjunction with antennas 940, along with other possible components of mobile device 115-e, may transmit information regarding flexible waveforms and/or scaling factors about the capability of the mobile device from the device 115-e to base stations and/or the core network. In some embodiments, the transceiver module 950, in conjunction with antennas 940, along with other possible components of mobile device 115-e, may transmit information, such as flexible waveforms and/or scaling factors about the capability of the mobile device, to base stations and/or the core network such that these devices or systems may utilize flexible waveforms in future transmission.

Figure 10:
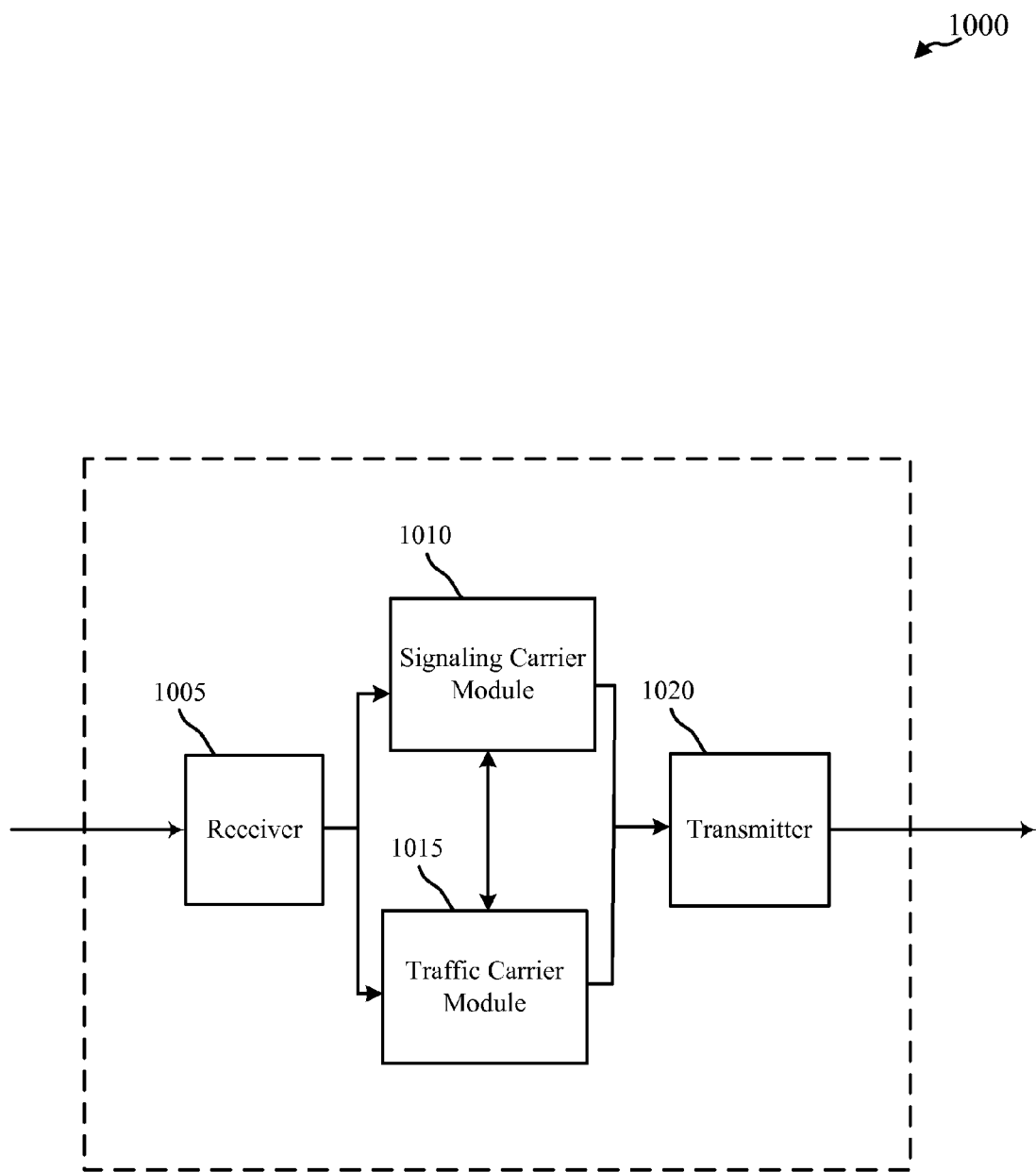
FIG. 10 shows a block diagram of a device that includes capacity boost functionality in accordance with various embodiments.

Turning next to FIG. 10, a block diagram illustrates a device 1000 that includes signaling and traffic data splitting functionality. The device 1000 may be an example of one or more of the base stations 105 described with reference to FIG. 1, FIG. 2A, FIG. 2B, FIG. 13, FIG. 11, and/or FIG. 12. The device 1000 may include a receiver module 1005, a signaling carrier module 1010, a traffic carrier module 1015, and/or a transmitter 1020. Each of these components may be in communication with each other.

These components of the device 1000 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1005 may receive information such as packet, data, and/or signaling information regarding what device 1000 has received, transmitted, or about a new mobile device attempting to register with the network. The received information may be utilized by the signaling carrier module 1010 and/or traffic carrier module 1015 for a variety of purposes.

The traffic carrier module 1015 may transmit traffic over a first carrier. By utilizing the signaling carrier module 1010, the signaling data may be transmitted over a second carrier separate from any other traffic data. In transmitting the signaling data separate from any other traffic data over the second carrier, the signaling data may be transmitted over the second carrier without any other traffic data.

Some embodiments include having device 1000 configured for transitioning from transmitting and/or receiving traffic data to/from a mobile device over the first carrier to transmitting the signaling data to the mobile device over the second carrier. Transitioning from transmitting the signaling data to the mobile device over the second carrier to transmitting and/or receiving the traffic data to the mobile device over the first carrier may also occur. The base station may perform a transition to transmitting and/or receiving traffic data over the first carrier and to transmitting signaling data over the second carrier.

In some embodiments, the signaling carrier module 1010 and/or the traffic carrier module 1015 may be configured such that at least the first carrier or the second carrier includes a flexible bandwidth carrier. The first carrier and the second carrier may utilize a common scaling factor. In some embodiments, at least the first carrier or the second carrier includes a normal bandwidth carrier.

Transmitting or receiving at least the traffic data or the signaling data utilizing the signaling carrier module 1010 and/or the traffic carrier module 1015 may boost at least a signaling capacity, a traffic capacity, or a paging capacity. The signaling data may include at least broadcast messages (such as system information), paging, synchronization, or pilot data. The traffic data may include at least user data or control information to assist the traffic data. The signal data may include at least cell configuration parameters, pages, or operator specific information that may or may not be needed for traffic data transmission on the first bandwidth carrier; this signaling data may be referred to as network data in some cases. In some embodiments, the second carrier is utilized for an idle mode and the first carrier is utilized for a connected mode.

In some embodiments, users within the first carrier and the second carrier are separated by at least codes, time, or frequency. Users on the first carrier may be separated differently from those on the second carrier. The users within the first carrier may be separated by time and the users on the second carrier are separated by frequency, for example. In some embodiments, the first carrier utilizes FDD and the second carrier utilizes TDD.

In some embodiments, the signaling carrier module 1010 and/or the traffic carrier module 1015 may be configured such that at least the first carrier or the second carrier may separate forward link and reverse link transmissions utilizing at least codes, time, or frequency. The first carrier and/or the second carrier may separate forward link and reverse link transmissions in different ways.

Some embodiments include scaling a bandwidth of the first carrier utilizing a first scaling factor and scaling a bandwidth of the second carrier utilizing a second scaling factor utilizing at least the signaling carrier module 1010 and/or the traffic carrier module 1015. The first scaling factor and the second scaling factor may be the same or different. At least the first scaling factor or the second scaling factor may be adjusted dynamically. Adjusting at least the first scaling factor or the second scaling factor dynamically may include adjusting at least the first scaling factor or the second scaling factor based upon expected traffic demand.

Some embodiments may include transmitting and/or receiving traffic data over a third carrier using the traffic carrier module 1015. Signaling data may be transmitted over the second carrier using the signaling carrier module 1010. The signal data may correspond to the traffic data over the third carrier using the signaling carrier module 1010 and/or the traffic carrier module 1015. The second carrier may carry information regarding the first carrier and/or the third carrier. The third carrier may be a flexible bandwidth carrier. Some embodiments may include transmitting and/or receiving traffic data over a third carrier and transmitting signaling data over a fourth carrier. The fourth carrier may carry information regarding the first carrier and/or the third carrier; the second carrier may carry information regarding the first carrier and/or the third carrier.

Figure 11:
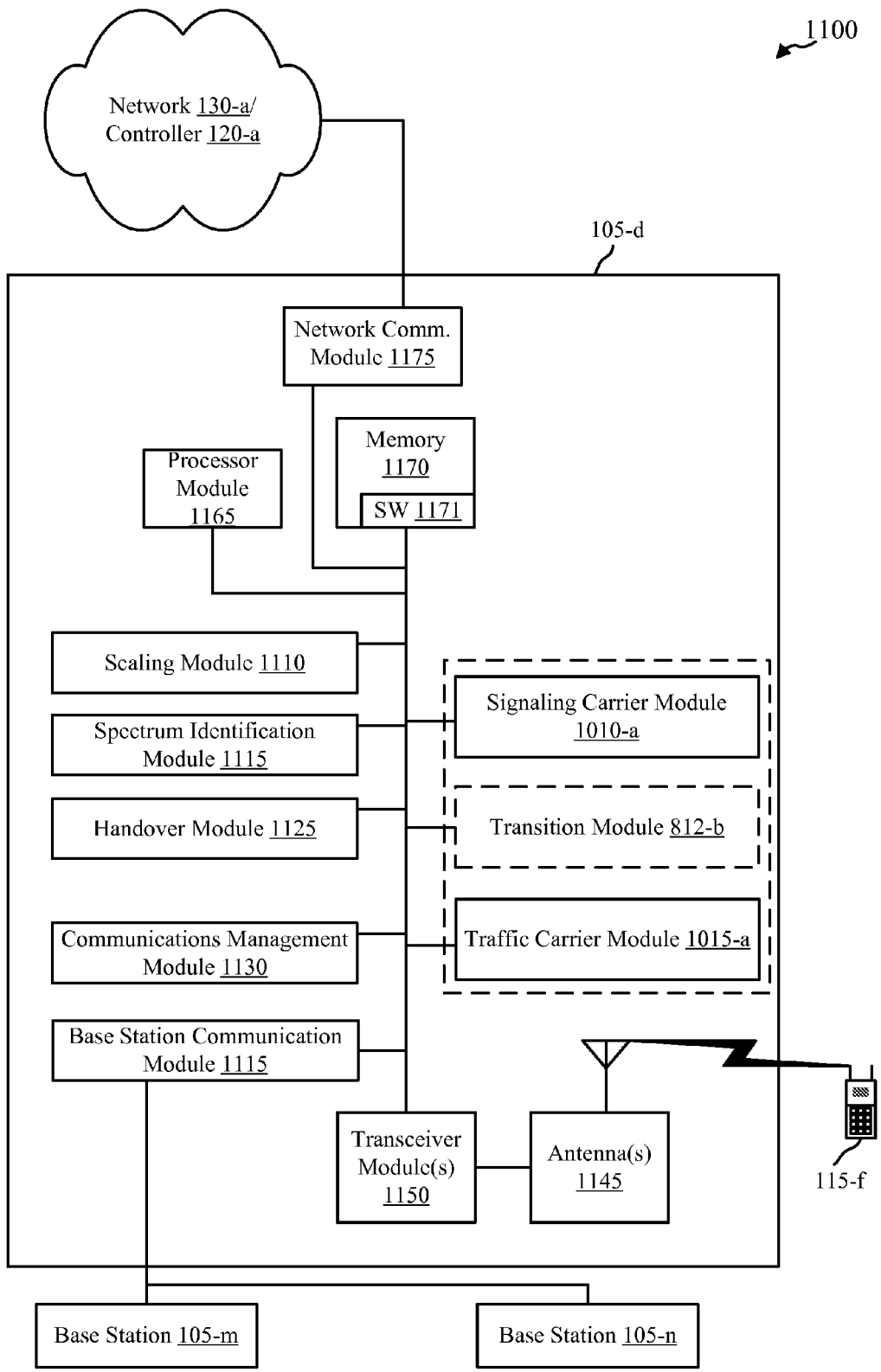
FIG. 11 shows a block diagram of a wireless communications system in accordance with various embodiments.

FIG. 11 shows a block diagram of a communications system 1100 that may be configured for separating signaling and traffic data in accordance with various embodiments. This system 1100 may be an example of aspects of the system 100 depicted in FIG. 1, system 200-*a* of FIG. 2A, system 200-*b* of FIG. 2B, system 300 of FIG. 3, and/or system 1200 of FIG. 12. The base station 105-*d* may include antennas 1145, a transceiver module 1150, memory 1170, and a processor module 1165, which each may be in communication, directly or indirectly, with each other (e.g., over one or more buses). The transceiver module 1150 may be configured to communicate bi-directionally, via the antennas 1145, with the mobile device 115-*f*, which may be a multi-mode mobile device. The transceiver module 1150 (and/or other components of the base station 105-*d*) may also be configured to communicate bi-directionally with one or more networks. In some cases, the base station 105-*d* may communicate with the core network 130-*a* and/or controller 120-*a* through network communications module 1175. Base station 105-*d* may be an example of an eNodeB base station, a Home eNodeB base station, a NodeB base station, and/or a Home NodeB base station. Controller 120-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with mobile device 115-*f* using different wireless communications technologies, such as different Radio Access Technologies. In some cases, base station 105-*d* may communicate with other base stations such as 105-*m* and/or 105-*n* utilizing base station communication module 1115. In some embodiments, base station communication module 1115 may provide an X2 interface within an LTE wireless communication technology to provide communication between some of the base stations 105. In some embodiments, base station 105-*d* may communicate with other base stations through controller 120-*a* and/or core network 130-*a*.

The memory 1170 may include random access memory (RAM) and read-only memory (ROM). The memory 1170 may also store computer-readable, computer-executable software code 1171 containing instructions that are configured to, when executed, cause the processor module 1165 to perform various functions described herein (e.g., call processing, database management, message routing, etc.). Alternatively, the software 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 30 ms in length) representative of the received audio, provide the audio packets to the transceiver module 1150, and provide indications of whether a user is speaking. Alternatively, an encoder may only provide packets to the transceiver module 1150, with the provision or withholding/suppression of the packet itself providing the indication of whether a user is speaking.

The transceiver module 1150 may include a modem configured to modulate the packets and provide the modulated packets to the antennas 1145 for transmission, and to demodulate packets received from the antennas 1145. While some examples of the base station 105-*d* may include a single antenna 1145, the base station 105-*d* preferably includes multiple antennas 1145 for multiple links which may support carrier aggregation. For example, one or more links may be used to support macro communications with mobile device 115-*f*.

According to the architecture of FIG. 11, the base station 105-*d* may further include a communications management module 1130. The communications management module 1130 may manage communications with other base stations 105. By way of example, the communications management module 1130 may be a component of the base station 105-*d* in communication with some or all of the other components of the base station 105-*d* via a bus. Alternatively, functionality of the communications management module 1130 may be implemented as a component of the transceiver module 1150, as a computer program product, and/or as one or more controller elements of the processor module 1165.

The components for base station 105-*d* may be configured to implement aspects discussed above with respect to device 800 in FIG. 8 and/or device 1000 of FIG. 10 and may not be repeated here for the sake of brevity. For example, the signaling carrier module 1010-*a* may be the signaling carrier module 1010 of FIG. 10. The traffic carrier module 1015-*a* may be an example of the traffic carrier module 1015 of FIG. 10. The transition module 812-b may be an example of the transition carrier module 812 of FIG. 8.

The base station 105-d may also include a spectrum identification module 1115. The spectrum identification module 1115 may be utilized to identify spectrum available for flexible waveforms. In some embodiments, a handover module 1125 may be utilized to perform reselection and handover procedures of the mobile device 115-f from one base station 105 to another. For example, the handover module 1125 may perform a handover procedure of the mobile device 115-f from signaling carrier to another signaling carrier, a traffic carrier to another traffic carrier and between a signaling and traffic carrier. The base stations 105 supporting these carriers may utilize normal waveforms or flexible waveforms between the mobile device 115-f and base stations 105. In some embodiments the transition module 812-b and the handover module 1125 may be combined in one module. A scaling module 1110 may be utilized to scale and/or alter chip rates to generate flexible waveforms.

In some embodiments, the transceiver module 1150 in conjunction with antennas 1145, along with other possible components of base station 105-d, may transmit information regarding flexible waveforms and/or scaling factors from the base station 105-d to the mobile device 115-f, to other base stations 105-m/105-n, or core network 130-a. In some embodiments, the transceiver module 1150 in conjunction with antennas 1145 along with other possible components of base station 105-d may transmit information to the mobile device 115-f, to other base stations 105-m/105-n, or core network 130-a, such as flexible waveforms and/or scaling factors, such that these devices or systems may utilize flexible waveforms.

Figure 12:
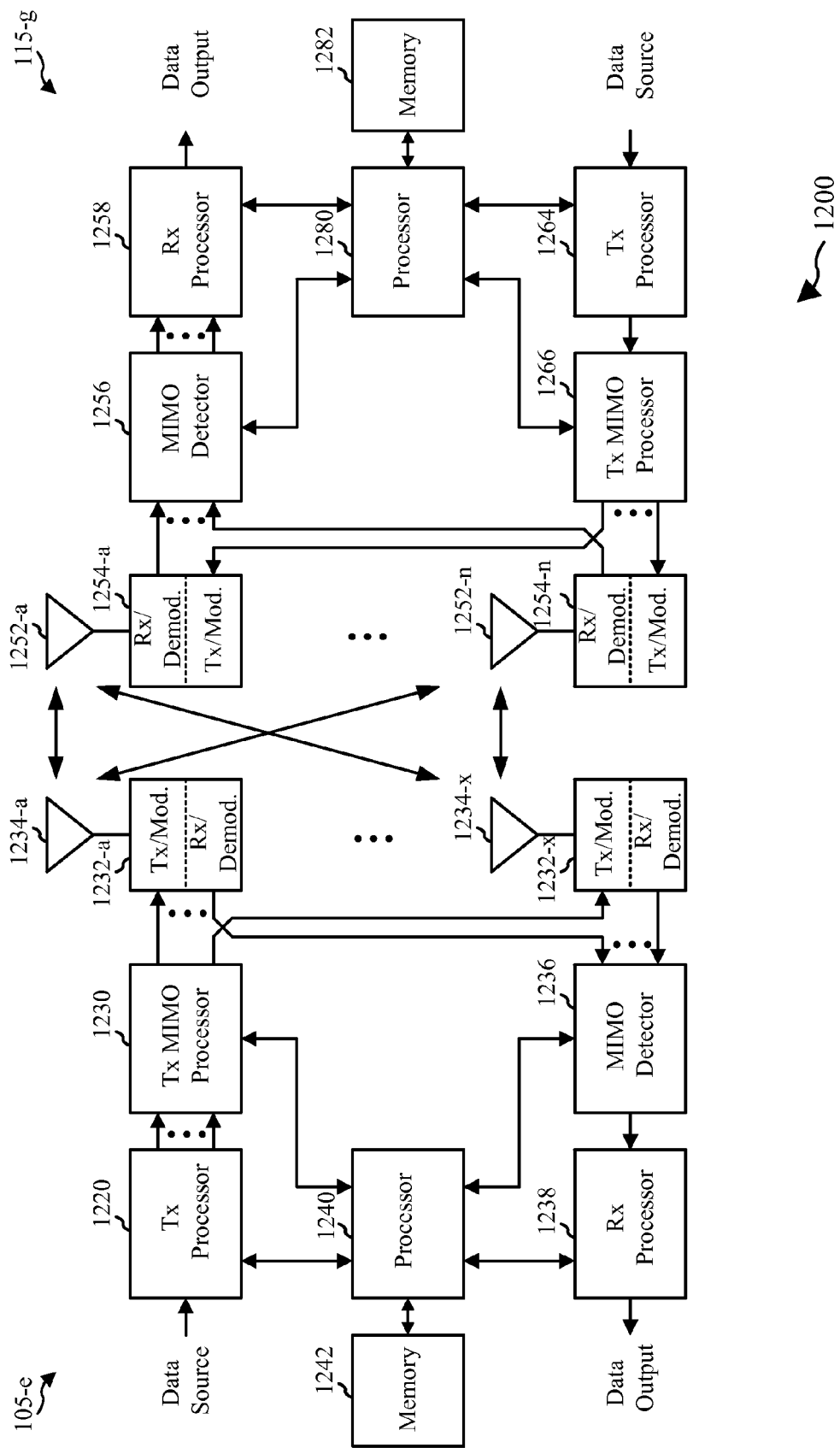
FIG. 12 shows a block diagram of a wireless communications system that includes a base station and a mobile device in accordance with various embodiments.

FIG. 12 is a block diagram of a system 1200 including a base station 105-e and a mobile device 115-g in accordance with various embodiments. This system 1200 may be an example of the system 100 of FIG. 1, system 200 of FIG. 2, system 300 of FIG. 3, and/or system 1400 of FIG. 14. The base station 105-e may be equipped with antennas 1234-a through 1234-x, and the mobile device 115-g may be equipped with antennas 1252-a through 1252-n. At the base station 105-e, a transmit processor 1220 may receive data from a data source.

The transmit processor 1220 may process the data. The transmit processor 1220 may also generate reference symbols, and a cell-specific reference signal. A transmit (TX) MIMO processor 1230 may perform spatial processing (e.g., precoding) on data symbols, control symbols, and/or reference symbols, if applicable, and may provide output symbol streams to the transmit modulators 1232-a through 1232-x. Each transmit modulator 1232 may process a respective output symbol stream (e.g., for OFDM, etc.) to obtain an output sample stream. Each transmit modulator 1232 may further process (e.g., convert to analog, amplify, filter, and upconvert) the output sample stream to obtain a downlink (DL) signal. In one example, DL signals from transmit modulators 1232-a through 1232-x may be transmitted via the antennas 1234-a through 1234-x, respectively. The transmitter processor 1220 may receive information from a processor 1240. The processor 1240 may be coupled with a memory 1242. The processor 1240 may be configured to generate flexible waveforms through altering a chip rate and/or utilizing a scaling factor; this may be done dynamically in some cases. The processor 1240 may also provide for different alignment and/or offsetting procedures. The processor 1240 may also utilize scaling and/or chip rate information to perform measurements on the other subsystems, perform handoffs to the other subsystems, perform reselection, etc. The processor 1240 may invert the effects of time stretching associated with the use of flexible bandwidth through parameter scaling. In some embodiments, the processor 1240 may be configured to separate the signaling and the data traffic into different carriers, which may be flexible bandwidth carriers. In some cases, this may be utilized so that assigned resources can be customized to the traffic pattern. In some embodiments, the processor 1240 may be implemented as part of a general processor, the transmitter processor 1220, and/or the receiver processor 1238.

At the mobile device 115-g, the mobile device antennas 1252-a through 1252-n may receive the DL signals from the base station 105-e and may provide the received signals to the demodulators 1254-a through 1254-n, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-a through 1254-n, perform MIMO detection on the received symbols if applicable, and provide detected symbols. A receive processor 1258 may process (e.g., demodulate, deinterleave, and decode) the detected symbols, providing decoded data for the mobile device 115-g to a data output, and provide decoded control information to a processor 1280, or memory 1282.

On the uplink (UL), at the mobile device 115-g, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the demodulators 1254-a through 1254-n (e.g., for SC-FDMA, etc.), and be transmitted to the base station 105-e in accordance with the transmission parameters received from the base station 105-e. The transmitter processor 1264 may also be configured to generate flexible waveforms through altering a chip rate and/or utilizing a scaling factor; this may be done dynamically in some cases. The transmit processor 1264 may receive information from processor 1280. The processor 1280 may provide for different alignment and/or offsetting procedures. The processor 1280 may also utilize scaling and/or chip rate information to perform measurements on the other subsystems, perform handoffs to the other subsystems, perform reselection, etc. The processor 1280 may invert the effects of time stretching associated with the use of flexible bandwidth through parameter scaling. At the base station 105-e, the UL signals from the mobile device 115-g may be received by the antennas 1234, processed by the demodulators 1232, detected by a MIMO detector 1236 if applicable, and further processed by a receive processor. The receive processor 1238 may provide decoded data to a data output and to the processor 1280. In some embodiments, the processor 1280 may be configured to separate the signaling and the data traffic into different carriers, which may be flexible bandwidth carriers. In some cases, this may be utilized so that assigned resources can be customized to the traffic pattern. In some embodiments, the processor 1280 may be implemented as part of a general processor, the transmitter processor 1264, and/or the receiver processor 1258.

Figure 13A:
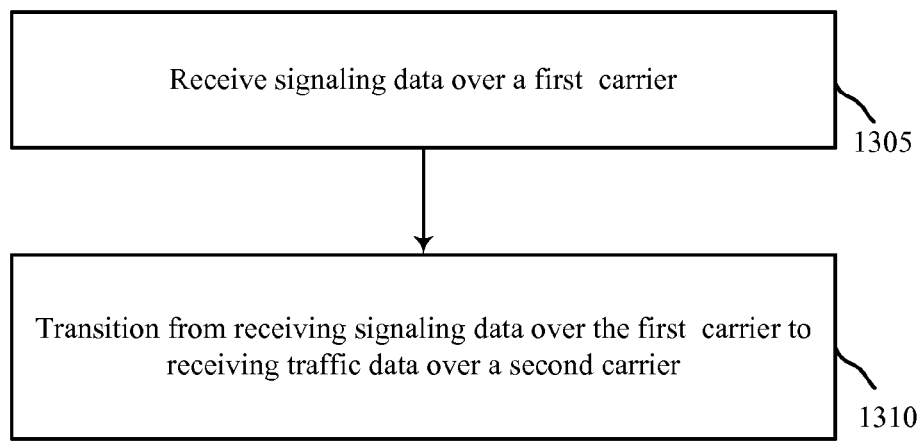
FIG. 13A shows a flow diagram of a method for boosting capacity in a wireless communications system in accordance with various embodiments.

Turning to FIG. 13A, a flow diagram of a method 1300-a of wireless communications. Method 1300-a may be implemented utilizing various wireless communications devices including, but not limited to: a mobile device 115 as seen in FIG. 1, FIG. 2A, FIG. 2B, FIG. 3, FIG. 9, FIG. 11, and/or FIG. 12; a base station 105 as seen in FIG. 1, FIG. 2A, FIG. 2B, FIG. 3, FIG. 11, and/or FIG. 12; a core network 130 or controller 120 as seen in FIG. 1 and/or FIG. 12; a device 800 of FIG. 8; and/or a device 1000 of FIG. 10.

At block 1305, signaling data may be received over a first carrier. At block 1310, transitioning from receiving signaling data over the first carrier to transmitting and/or receiving traffic data over a second carrier may occur. In some embodiments, the traffic data corresponds to the signaling data. In some embodiments, the signaling data may be received over the first carrier separate from any other traffic data. For example, the signaling data may be received over the first carrier without any other traffic data. In some embodiments, the signaling data such as mobile device registration can be transmitted over the first carrier.

In some embodiments, a transition is performed to transmitting and/or receiving traffic data over the first carrier and transmitting signaling data over the second carrier. In some embodiments, a transition is performed to transmitting and receiving traffic data over the first carrier and transmitting and/or receiving signaling data over the second bandwidth carrier. Some embodiments further include transitioning from at least transmitting or receiving traffic data over the second carrier to at least transmitting or receiving traffic data over a third carrier. Some embodiments further include transitioning from receiving signaling data over the first carrier to receiving signaling data over a fourth carrier. Some embodiments further include transmitting signaling data over the first carrier. In some embodiments, the first carrier utilizes a first bandwidth and the second carrier utilizes a second bandwidth. In some embodiments, the first carrier carries information regarding the second carrier.

Some embodiments include scaling the first bandwidth utilizing a first scaling factor and scaling the second bandwidth utilizing a second scaling factor. The first scaling factor and the second scaling factor may be the same or different. At least the first scaling factor or the second scaling factor, or the first bandwidth and/or the second bandwidth, may be adjusted dynamically. Adjusting at least the first scaling factor or the second scaling factor, or at least the first bandwidth or the second bandwidth, dynamically may include adjusting at least the first scaling factor or the second scaling factor, or at least the first bandwidth or the second bandwidth, based upon expected traffic demand. Some embodiments include scaling at least an uplink or a downlink for at least the first bandwidth or the second bandwidth utilizing different scaling factors.

In some embodiments, at least the first carrier or the second carrier includes a flexible bandwidth carrier. The first carrier and the second carrier may utilize a common scaling factor. In some embodiments, at least the first carrier or the second carrier includes a normal bandwidth carrier.

In some embodiments, transmitting and/or receiving at least the traffic data or the signaling data may boost at least a signaling capacity, a traffic capacity, or a paging capacity. The signaling data may include at least broadcast messages (such as system information), paging, synchronization, or pilot data. The traffic data may include at least user data or control information to assist the traffic data. The signaling data may also include at least cell configuration parameters, pages, or operator specific information that may or not may not be needed for traffic data transmission on the first bandwidth carrier; in some cases, this signaling data may be referred to as network data. In some embodiments, the first carrier is utilized for an idle mode and the second carrier is utilized for a connected mode.

In some embodiments, users within the first carrier and the second carrier are separated by at least codes, time, or frequency. Users on the first carrier may be separated differently from those on the second carrier. The users within the first carrier may be separated by time and the users on the second carrier are separated by frequency, for example. In some embodiments, the first carrier utilizes FDD and the second carrier utilizes TDD.

In some embodiments, at least the first carrier or the second carrier separates forward link and reverse link transmissions utilizing at least codes, time, or frequency. The first carrier and the second carrier may separate forward link and reverse link transmissions in different ways.

Some embodiments include receiving traffic data over a third carrier. Signaling data may be received over the first carrier. The first carrier may carry information regarding at least the second carrier or third carrier corresponding to the traffic data over the third carrier. The third carrier may be a flexible bandwidth carrier. Some embodiments include receiving traffic data over a third carrier and transmitting signaling data over a fourth carrier. The signaling data over the fourth carrier may correspond to the traffic data over the third carrier. The fourth carrier may carry information regarding the second and/or third carrier.

Figure 13B:
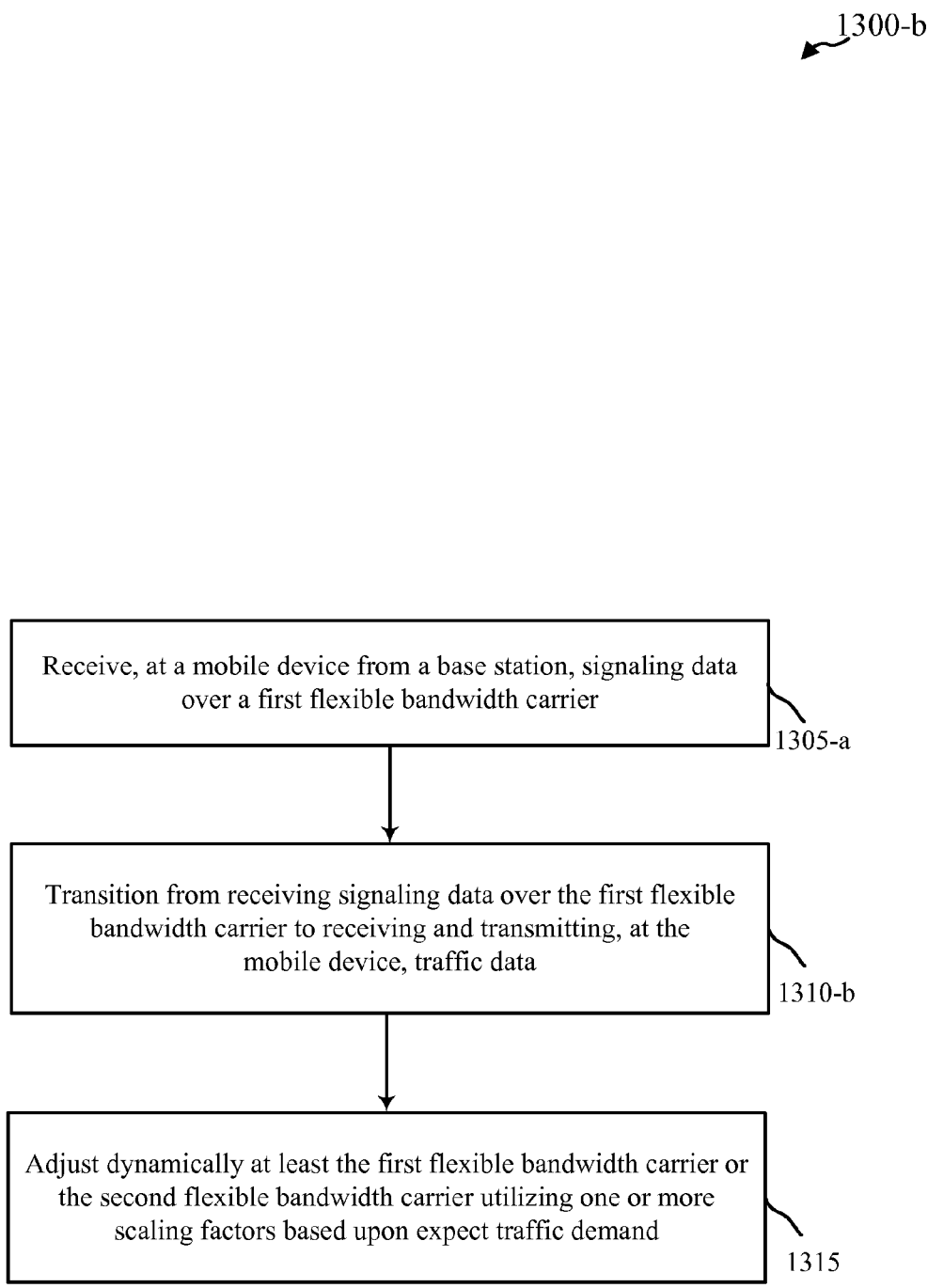
FIG. 13B shows a flow diagram of a method for boosting capacity in a wireless communications system in accordance with various embodiments.

Turning to FIG. 13B, a flow diagram of a method 1300-b of wireless communications. Method 1300-b may be implemented utilizing various wireless communications devices including, but not limited to: a mobile device 115 as seen in FIG. 1, FIG. 2A, FIG. 2B, FIG. 3, FIG. 9, FIG. 11, and/or FIG. 12; a base station 105 as seen in FIG. 1, FIG. 2A, FIG. 2B, FIG. 3, FIG. 11, and/or FIG. 12; a core network 130 or controller 120 as seen in FIG. 1 and/or FIG. 12; a device 800 of FIG. 8; and/or a device 1000 of FIG. 10.

At block 1305-a, signaling data may be received at a mobile device from a base station over a first flexible bandwidth carrier. At block 1310-a, transitioning from receiving signaling data over the first flexible bandwidth carrier to transmitting and receiving traffic data may occur at the mobile device. In some cases, the traffic data corresponds to the signaling data over a second flexible bandwidth carrier. At block 1315, at least the first flexible bandwidth carrier or the second flexible bandwidth carrier may be dynamically adjusted utilizing one or more scaling factors based upon expected traffic demand.

Figure 14A:
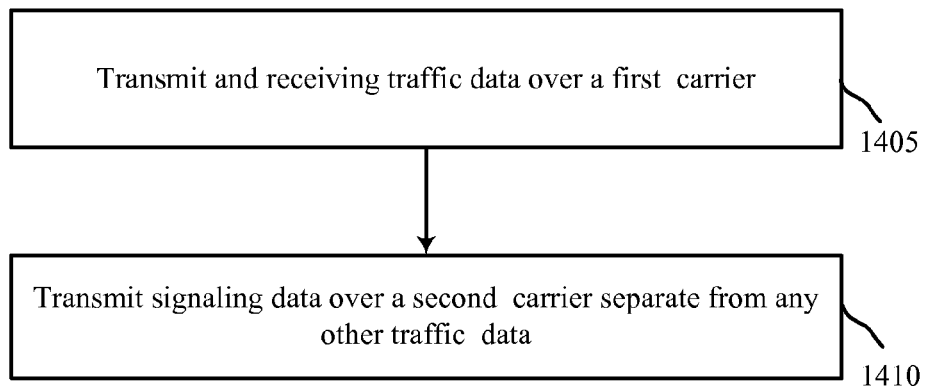
FIG. 14A shows a flow diagram of a method for boosting capacity in a wireless communications system in accordance with various embodiments.

Turning to FIG. 14A, a flow diagram of a method 1400-a of wireless communications. Method 1400-a may be implemented utilizing various wireless communications devices including, but not limited to: a mobile device 115 as seen in FIG. 1, FIG. 2A, FIG. 2B, FIG. 3, FIG. 9, FIG. 11, and/or FIG. 12; a base station 105 as seen in FIG. 1, FIG. 2A, FIG. 2B, FIG. 3, FIG. 11, and/or FIG. 12; a core network 130 or controller 120 as seen in FIG. 1 and/or FIG. 12; a device 800 of FIG. 8; and/or a device 1000 of FIG. 10.

At block 1405, traffic data may be transmitted and/or received over a first carrier. At block 1410, signaling data may be transmitted over a second carrier separate from any other traffic data. In some cases, the signaling data corresponds to the traffic data. In transmitting the signaling data separate from any other traffic data over the second carrier, the signaling data may be transmitted over the second carrier without any other traffic data.

Some embodiments include transitioning from transmitting and receiving the traffic data to a mobile device over the first carrier to transmitting the signaling data to the mobile device over the second bandwidth carrier. Transitioning from transmitting the signaling data to the mobile device over the second carrier to transmitting and receiving the traffic data to the mobile device over the first carrier may also occur. A transition may be performed to transmitting and receiving the traffic data over the first carrier and transmitting signaling over the second carrier. The second carrier may carry information regarding at least the first carrier. Signaling data may be received over the second carrier in some cases.

In some embodiments, at least the first carrier or the second carrier includes a flexible bandwidth carrier. The first carrier and the second carrier may utilize a common scaling factor. In some embodiments, at least the first carrier or the second carrier includes a normal bandwidth carrier.

Transmitting and/or receiving at least the traffic data, the network data, or the signaling data may boost at least a signaling capacity, a traffic capacity, or a paging capacity. The signaling data may include at least broadcast messages (such as system information), paging, synchronization, or pilot data. The traffic data may include at least user data or control information to assist the traffic data. The signal data may also include at least cell configuration parameters, pages, or operator-specific information that may or not may not be needed for traffic data transmission on the first carrier; this data may be referred to as network data in some cases. In some embodiments, the second carrier is utilized for an idle mode and the first carrier is utilized for a connected mode.

In some embodiments, users within the first carrier and the second carrier are separated by at least codes, time, or frequency. Users on the first carrier may be separated differently from those on the second carrier. The users within the first carrier may be separated by time and the users on the second carrier are separated by frequency, for example. In some embodiments, the first carrier utilizes FDD and the second carrier utilizes TDD.

In some embodiments, at least the first carrier or the second carrier separates forward link and reverse link transmissions utilizing at least codes, time, or frequency. The first carrier and the second carrier may separate forward link and reverse link transmissions in different ways.

Some embodiments include scaling a bandwidth of the first bandwidth carrier utilizing a first scaling factor and scaling a bandwidth of the second bandwidth carrier utilizing a second scaling factor. The first scaling factor and the second scaling factor may be the same or different. At least the first scaling factor or the second scaling factor may be adjusted dynamically. Adjusting at least the first scaling factor or the second scaling factor dynamically may include adjusting at least the first scaling factor or the second scaling factor based upon expected traffic demand.

Some embodiments may include transmitting and receiving traffic data over a third carrier. Signaling data may be transmitted over the second carrier. The signaling data may correspond to the traffic data the third carrier. The second carrier may carry information regarding at least the first carrier or the third carrier. The third carrier may be a flexible bandwidth carrier. Some embodiments may include transmitting and receiving traffic data over a third carrier and transmitting signaling data over a fourth carrier. The fourth carrier may carry information regarding at least the first carrier or the third carrier and the second carrier may carry information regarding at least the first carrier or the third carrier. The signaling data over the fourth carrier may correspond to the traffic data the third carrier.

Figure 14B:
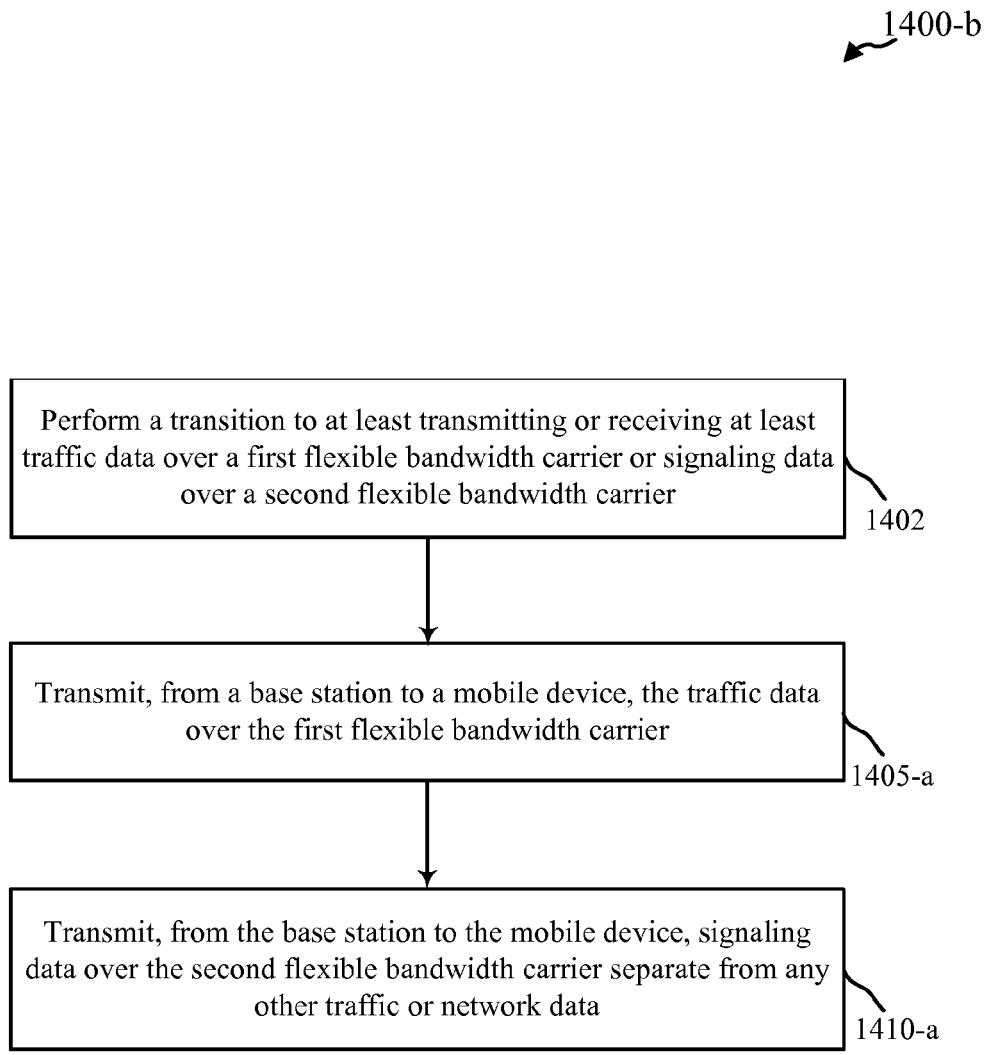
FIG. 14B shows a flow diagram of a method for boosting capacity in a wireless communications system in accordance with various embodiments.

Turning to FIG. 14B, a flow diagram of a method 1400-*b* of wireless communications. Method 1400-*b* may be implemented utilizing various wireless communications devices including, but not limited to: a mobile device 115 as seen in FIG. 1, FIG. 2A, FIG. 2B, FIG. 3, FIG. 9, FIG. 11, and/or FIG. 12; a base station 105 as seen in FIG. 1, FIG. 2A, FIG. 2B, FIG. 3, FIG. 11, and/or FIG. 12; a core network 130 or controller 120 as seen in FIG. 1 and/or FIG. 12; a device 800 of FIG. 8; and/or a device 1000 of FIG. 10.

At block 1402, a transition to transmitting or receiving at least traffic data over a first flexible bandwidth carrier or signaling data over a second flexible bandwidth carrier may be performed. The signaling data may correspond to the traffic data in some cases. At block 1405-*a*, the traffic data may be transmitted over a first flexible bandwidth carrier from a base station to a mobile device. At block 1410-*a*, signaling data may be transmitted over the second flexible bandwidth carrier separate from any other traffic from the base station to the mobile device.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications, the method comprising:
   receiving signaling data over a first carrier; and
   transitioning from receiving the signaling data over the first carrier to at least transmitting or receiving traffic data associated with the signaling data over a second carrier, wherein the first carrier or the second carrier comprises a scaled flexible bandwidth carrier that is dynamically adjustable.

2. The method of claim 1, further comprising:
   performing a transition from at least transmitting or receiving the traffic data over the second carrier to receiving the signaling data over the first carrier.

3. The method of claim 1, further comprising:
   transitioning from at least transmitting or receiving the traffic data over the second carrier to at least transmitting or receiving the traffic data over a third carrier.

4. The method of claim 2, further comprising:
   transitioning from receiving the signaling data over the first carrier to receiving the signaling data over a fourth carrier.

5. The method of claim 1, further comprising:
   transmitting signaling data over the first carrier.

6. The method of claim 1, wherein the first carrier carries information regarding the second carrier.

7. The method of claim 1, wherein receiving the signaling data over the first carrier and at least transmitting or receiving the traffic data over the second carrier occurs at a mobile device.

8. The method of claim 1, wherein the first carrier utilizes a first bandwidth and the second carrier utilizes a second bandwidth.

9. The method of claim 8, further comprising:
   scaling the first bandwidth utilizing a first scaling factor; and
   scaling the second bandwidth utilizing a second scaling factor.

10. The method of claim 9, further comprising:
    adjusting at least the first bandwidth or the second bandwidth dynamically.

11. The method of claim 10, wherein adjusting at least the first bandwidth or the second bandwidth dynamically comprises:
    adjusting at least the first bandwidth or the second bandwidth based upon expected traffic demand.

12. The method of claim 9, wherein scaling the first bandwidth utilizing the first scaling factor or scaling the second bandwidth utilizing the second factor further comprises:
    scaling at least an uplink or a downlink for at least the first bandwidth or the second bandwidth utilizing different scaling factors.

13. A method of wireless communications, the method comprising:
    at least transmitting or receiving traffic data over a first carrier, wherein the first carrier comprises a scaled flexible bandwidth carrier that is dynamically adjustable; and
    transmitting signaling data associated with the traffic data over a second carrier separate from any other traffic data.

14. The method of claim 13, further comprising:
    transitioning from at least transmitting or receiving the traffic data to a mobile device over the first carrier to transmitting the signaling data to the mobile device over the second carrier.

15. The method of claim 14, further comprising:
    transitioning from transmitting the signaling data to the mobile device over the second carrier to at least transmitting or receiving the traffic data to the mobile device over the first carrier.

16. The method of claim 13, further comprising:
    performing a transition to at least transmitting or receiving the traffic data over the first carrier and transmitting the signaling data over the second carrier.

17. The method of claim 13, wherein the second carrier carries information regarding at least the first carrier.

18. The method of claim 13, further comprising:
    receiving signaling data over the second carrier.

19. The method of claim 13, wherein the second carrier comprises a flexible bandwidth carrier.

20. The method of claim 19, wherein the first bandwidth and the second bandwidth utilize a common scaling factor.

21. The method of claim 19, wherein the second carrier comprises a normal bandwidth carrier.

22. The method of claim 13, wherein at least transmitting or receiving the traffic data or transmitting the signaling data boosts at least a signaling capacity, a traffic capacity, or a paging capacity.

23. The method of claim 13, wherein the signaling data comprises at least broadcast messages, system information paging, synchronization, pilot data, cell configuration parameters, pages, or operator specific information that may or not may not be needed for traffic data transmission on the first carrier.

24. The method of claim 13, wherein the traffic data comprises at least user data or control information to assist the traffic data.

25. The method of claim 13, wherein the second carrier is utilized for an idle mode and the first bandwidth carrier is utilized for a connected mode.

26. The method of claim 13, wherein users within the first carrier and the second carrier are separated by at least codes, time, or frequency.

27. The method of claim 13, wherein users on the first carrier are separated differently from those on the second carrier.

28. The method of claim 27, wherein users within the first carrier are separated by time and the users on the second carrier are separated by frequency.

29. The method of claim 13, wherein the first carrier utilizes FDD and the second carrier utilizes TDD.

30. The method of claim 13, wherein at least the first carrier or the second carrier separates forward link and reverse link transmissions utilizing at least codes, time, or frequency.

31. The method of claim 30, wherein the first carrier and the second carrier separate forward link and reverse link transmissions in different ways.

32. The method of claim 13, wherein a bandwidth of the first carrier is scaled utilizing a first scaling factor and a bandwidth of the second carrier is scaled utilizing a second scaling factor.

33. The method of claim 32, wherein at least the first scaling factor or the second scaling factor is dynamically adjusted.

34. The method of claim 33, where dynamically adjusting at least the first scaling factor or the second scaling factor is based upon expected traffic demand.

35. The method of claim 13, further comprising:
at least transmitting or receiving traffic data over a third carrier; and
transmitting signaling data over the second carrier, wherein the second carrier carriers information regarding at least the first carrier or the third carrier.

36. The method of claim 13, further comprising:
at least transmitting or receiving traffic data over a third carrier; and
transmitting signaling data over a fourth carrier, wherein the fourth carrier carries information regarding at least the first carrier or the third carrier and the second carrier carries information regarding at least the first carrier or the third carrier.

37. The method of claim 13, wherein at least transmitting or receiving at least the traffic data or the signaling data occurs at a base station.

38. The method of claim 13, wherein at least transmitting or receiving at least the traffic data or the signaling data occurs at a mobile device.

39. A wireless communications system comprising:
a means for receiving signaling data over a first carrier; and
a means for transitioning from receiving signaling data over the first carrier to at least transmitting or receiving traffic data associated with the signaling data over a second carrier, wherein the first carrier or the second carrier comprises a scaled flexible bandwidth carrier that is dynamically adjustable.

40. The wireless communications system of claim 39, further comprising:
a means for performing a transition from at least transmitting or receiving the traffic data over the second carrier to receiving the signaling data over the first carrier.

41. The wireless communications system of claim 39, wherein the first carrier utilizes a first bandwidth and the second carrier utilizes a second bandwidth, and further comprising:
a means for scaling the first bandwidth utilizing a first scaling factor; and
a means for scaling the second bandwidth utilizing a second scaling factor.

42. The wireless communications system of claim 41, further comprising:
a means for adjusting at least the first scaling factor or the second scaling factor dynamically.

43. The wireless communications system of claim 42, wherein the means for adjusting at least the first scaling factor or the second scaling factor dynamically comprises:
a means for adjusting at least the first scaling factor or the second scaling factor based upon expected traffic demand.

44. A computer program product for a wireless communications system comprising:
a non-transitory computer-readable medium comprising:
code for receiving signaling data over a first carrier; and
code for transitioning from receiving signaling data associated with the signaling data over the first carrier to at least transmitting or receiving traffic data over a second carrier, wherein the first carrier or the second carrier comprises a scaled flexible bandwidth carrier that is dynamically adjustable.

45. The computer program product of claim 44, wherein the non-transitory computer-readable medium further comprising:
code for performing a transition from at least transmitting or receiving the traffic data over the second carrier to receiving the signaling data over the first carrier.

46. The computer program product of claim 44, wherein the non-transitory computer-readable medium further comprising:
code for scaling a bandwidth of the first carrier utilizing a first scaling factor; and
code for scaling a bandwidth of the second carrier utilizing a second scaling factor.

47. The computer program product of claim 46, wherein the non-transitory computer-readable medium further comprising:
code for adjusting at least the first scaling factor or the second scaling factor dynamically.

48. The computer program product of claim 47, wherein the non-transitory computer-readable medium further comprising code for adjusting at least the first scaling factor or the second scaling factor dynamically further comprising:
code for adjusting at least the first scaling factor or the second scaling factor based upon expected traffic demand.

49. A wireless communications device comprising:
at least one processor configured to:
receive signaling data over a first carrier; and
transition from receiving signaling data over the first carrier to at least transmitting or receiving traffic data associated with the signaling data over a second carrier, wherein the first carrier or the second carrier comprises a scaled flexible bandwidth carrier that is dynamically adjustable; and
at least one memory coupled with the at least one processor.

50. The wireless communications device of claim 49, wherein the at least one processor is further configured to:
perform a transition from at least transmitting or receiving the traffic data over the second carrier to receiving the signaling data over the first carrier.

51. The wireless communications device of claim 49, wherein the at least one processor is further configured to:

scale a bandwidth of the first carrier utilizing a first scaling factor; and
scale a bandwidth of the second carrier utilizing a second scaling factor.

52. The wireless communications device of claim 51, wherein the at least one processor is further configured to:
adjust at least the first scaling factor or the second scaling factor dynamically.

53. The wireless communications device of claim 52, wherein the at least one processor is configured to adjust at least the first scaling factor or the second scaling factor dynamically is further configured to:
adjust at least the first scaling factor or the second scaling factor based upon expected traffic demand.

54. A wireless communications system comprising
a means for at least transmitting or receiving traffic data over a first carrier, wherein the first carrier comprises a scaled flexible bandwidth carrier that is dynamically adjustable; and
a means for transmitting signaling data associated with the traffic data over a second carrier separate from any other traffic data.

55. The wireless communications system of claim 54, further comprising:
a means for transitioning from at least transmitting or receiving the traffic data to a mobile device over the first carrier to transmitting the signaling data to the mobile device over the second carrier.

56. The wireless communications system of claim 55, further comprising:
a means for transitioning from transmitting the signaling data to the mobile device over the second carrier to at least transmitting or receiving the traffic data to the mobile device over the first carrier.

57. The wireless communications system of claim 54, further comprising:
a means for performing a transition to at least transmitting or receiving the traffic data over the first carrier and transmitting signaling data over the second carrier.

58. The wireless communications system of claim 54, further comprising:
a means for at least transmitting or receiving the traffic data over a third carrier; and
a means for transmitting signaling data over the second carrier, wherein the second carrier carries information regarding at least the first carrier or the second carrier.

59. A computer program product for a wireless communications system comprising:
a non-transitory computer-readable medium comprising:
code for at least transmitting or receiving traffic data over a first carrier, wherein the first carrier comprises a scaled flexible bandwidth carrier that is dynamically adjustable; and
code for transmitting signaling data associated with the traffic data over a second carrier separate from any other traffic data.

60. The computer program product of claim 59, wherein the non-transitory computer-readable medium further comprising:
code for transitioning from at least transmitting or receiving the traffic data to a mobile device over the first carrier to transmitting the signaling data to the mobile device over the second carrier.

61. The wireless communications system of claim 60, wherein the non-transitory computer-readable medium further comprising:
code for transitioning from transmitting the signaling data to the mobile device over the second carrier to at least transmitting or receiving the traffic data to the mobile device over the first carrier.

62. The computer program product of claim 59, wherein the non-transitory computer-readable medium further comprising:
code for performing a transition to at least transmitting or receiving the traffic data over the first carrier and transmitting signaling data over the second carrier.

63. The computer program product of claim 59, wherein the non-transitory computer-readable medium further comprising:
code for at least transmitting or receiving traffic data over a third carrier; and
code for transmitting signaling data over the second carrier, wherein the second carrier carries information regarding at least the first carrier or the third carrier.

64. A wireless communications device comprising:
at least one processor configured to:
at least transmit or receive traffic data over a first carrier, wherein the first carrier comprises a scaled flexible bandwidth carrier that is dynamically adjustable; and
transmit signaling data associated with the traffic data over a second carrier separate from any other traffic data; and
at least one memory coupled with the at least one processor.

65. The wireless communications device of claim 64, wherein the at least one processor is further configured to:
transition from at least transmitting or receiving the traffic data to a mobile device over the first carrier to transmitting the signaling data to the mobile device over the second carrier.

66. The wireless communications device of claim 65, wherein the at least one processor is further configured to:
transition from transmitting the signaling data to the mobile device over the second carrier to transmitting the traffic data to the mobile device over the first carrier.

67. The wireless communications device of claim 64, wherein the at least one processor is further configured to:
perform a transition to at least transmitting or receiving the traffic data over the first carrier and transmitting signaling data over the second carrier.

68. The wireless communications device of claim 64, wherein the at least one processor is further configured to:
at least transmit or receive traffic data over a third carrier; and
transmit signaling data over the second carrier, wherein the second carrier carries information regarding at least the first carrier or the third carrier.

* * * * *